(12) United States Patent
Boscia

(10) Patent No.: US 12,134,047 B1
(45) Date of Patent: Nov. 5, 2024

(54) CENTRIFUGES

(71) Applicant: Christopher Camiré, Morgan Hill, CA (US)

(72) Inventor: Bryan Dillon Boscia, Sebastopol, CA (US)

(73) Assignee: Christopher Camiré, Morgan Hill, CA (US)

( * ) Notice: Subject to any disclaimer, the term of this patent is extended or adjusted under 35 U.S.C. 154(b) by 438 days.

(21) Appl. No.: 17/486,680

(22) Filed: Sep. 27, 2021

Related U.S. Application Data

(60) Provisional application No. 63/083,799, filed on Sep. 25, 2020.

(51) Int. Cl.
| | |
|---|---|
| *B01D 11/02* | (2006.01) |
| *B04B 7/02* | (2006.01) |
| *B04B 7/12* | (2006.01) |
| *B04B 9/14* | (2006.01) |

(52) U.S. Cl.
CPC ...... *B01D 11/0273* (2013.01); *B01D 11/0207* (2013.01); *B04B 7/02* (2013.01); *B04B 7/12* (2013.01); *B04B 9/14* (2013.01)

(58) Field of Classification Search
CPC .... B04B 3/00; B04B 7/02; B04B 7/12; B04B 7/16; B04B 9/14; B04B 2009/143; B01D 11/0273; B01D 11/0207
USPC ................................ 210/380.1, 360.1, 198.1
See application file for complete search history.

(56) References Cited

U.S. PATENT DOCUMENTS

| | | | | |
|---|---|---|---|---|
| 3,861,584 | A * | 1/1975 | Dudrey | B04B 5/00 494/52 |
| 5,582,742 | A * | 12/1996 | Wilkie | B04B 11/06 210/781 |
| 5,897,482 | A * | 4/1999 | Lowe | B04B 7/02 494/12 |
| 6,442,782 | B1 * | 9/2002 | Vande Haar | D06F 37/245 74/572.4 |
| 10,814,338 | B2 * | 10/2020 | Stephens | B04B 11/06 |

FOREIGN PATENT DOCUMENTS

CZ          29669 U1 *  8/2016

OTHER PUBLICATIONS

Jakes, English Machine translation CZ 29669U1, pp. 1-5. (Year: 2016).*

* cited by examiner

*Primary Examiner* — Claire A Norris
(74) *Attorney, Agent, or Firm* — Heisler & Associates

(57) ABSTRACT

Described herein are examples of centrifuges. A centrifuge may include a basin to contain a solvent and a biomass. The centrifuge may further include a lid connected to the basin via a hinge and configured to selectively close a top opening of the basin. The centrifuge may further include circular basket disposed within the basin. The centrifuge may further include a balancing ring to counterbalance contents of the basin. The balancing ring may include two or more spherical weights and a race configured to receive the two or more spherical weights and configured to permit the two or more spherical weights to move within the race while the centrifuge is spinning, thereby counterbalancing the contents of the basin.

15 Claims, 30 Drawing Sheets

2000

| Specifications | |
|---|---|
| Maximum Speed | 1800 rpm |
| Maximum RCF | 1100 G |
| Load Capacities | ≈30 lbs. dry biomass (basket) / ≈230L solvent (basin) |
| Maximum Temperature | 35°C (95°F) |
| Minimum Temperature | -80°C (-112°F) |
| Maximum pressure | ≈ 3 psi (incidental) |
| Vacuum | ≈ -3 psi (incidental) |
| Controller | Red Lion 7" HMI Certified for Class 1 Div 2, as configured |
| Speed set range | 1 - 1800 rpm |
| Timer set range | 1 - 99 minutes |
| Safety Features | E-Stop, Vibration Sensor & Lid Proximity Sensor (all C1D2) |
| Motor | 5HP Baldor motor (C1D2 certified) |
| Power Supply | 220 V / 30.8A / 60 Hz (NEC Class 2) |
| External Dimensions | 55.25"L x 37.25"W x 36"H |
| Net Weight | 1765 lbs. / 800 kg |
| Gross Filled Weight | ≈2500 lbs. / 1134 kg |

FIG. 20

CENTRIFUGES

CROSS REFERENCE TO RELATED APPLICATIONS

The present application claims the benefit of U.S. Provisional Patent Application No. 63/083,799 entitled "CENTRIFUGES AND METHODS OF USE", filed on Sep. 25, 2020. The entire contents of the above-listed application are hereby incorporated by reference for all purposes.

BACKGROUND

Separation of biomass components, or additives thereto, may form part of a process of producing a finished product. For example, production of certain terpenoid or alkaloid products may involve an extraction or separation stage from the raw or prepared biomass. Such products may undergo a separation process for purification or enhancement purposes.

BRIEF DESCRIPTION OF THE DRAWINGS

The present description will be understood more fully when viewed in conjunction with the accompanying drawings of various examples of centrifuges. The description is not meant to limit the centrifuges to the specific examples. Rather, the specific examples depicted and described are provided for explanation and understanding of centrifuges. Throughout the description the drawings may be referred to as drawings, figures, and/or FIGS.

FIG. 20 illustrates a table of specifications of an example centrifuge, according to an embodiment.

DETAILED DESCRIPTION

Figure 1:
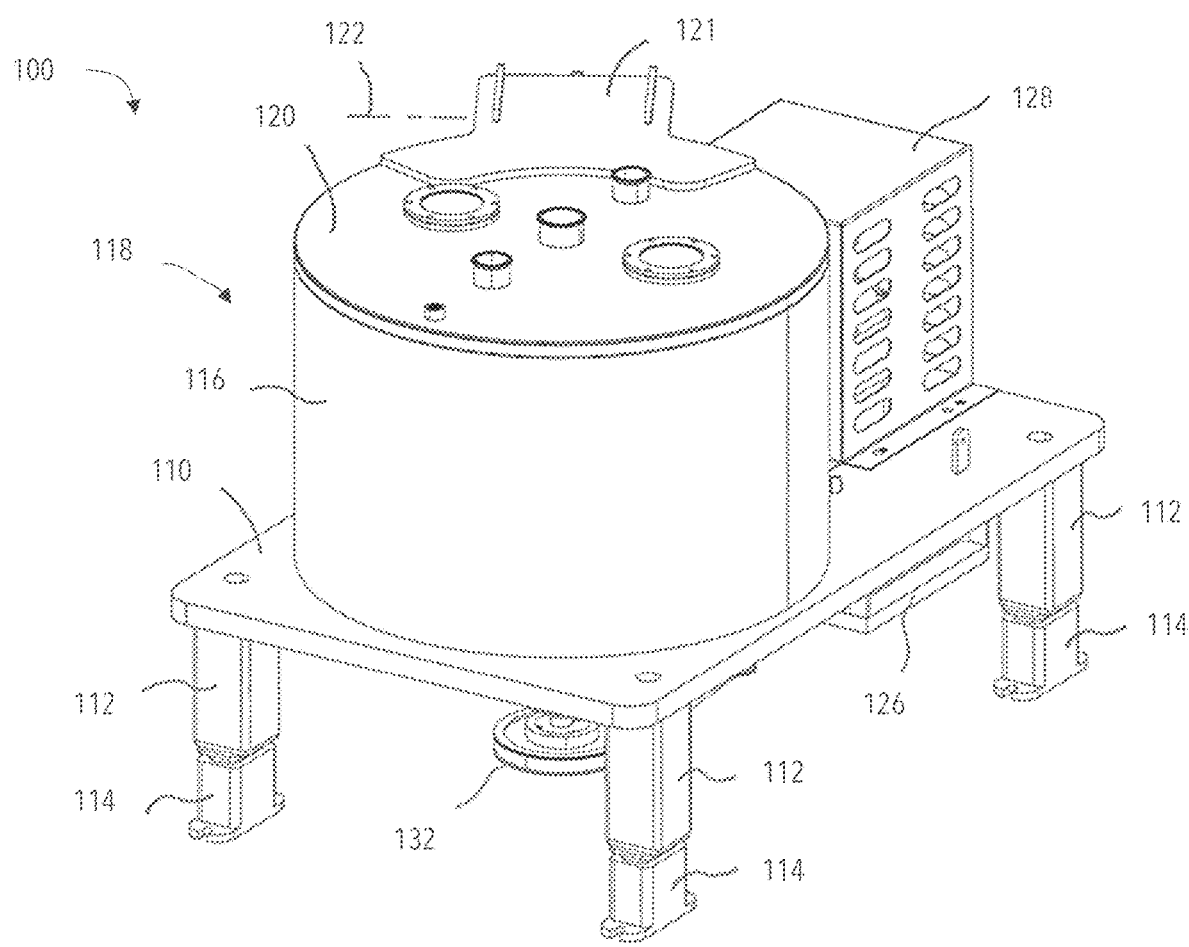
FIG. 1 illustrates a perspective view of a centrifuge, according to an embodiment.

Centrifuges as disclosed herein will become better understood through a review of the following detailed description in conjunction with the figures. The detailed description and figures provide merely examples of the various embodiments of centrifuges. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Conventional centrifuges may include basket centrifuge devices. Basket centrifuge devices may implement a "flooded basin." A conventional centrifuge may include a raised platform with a motor housing and a hinged lid covering a cylindrical basin affixed thereto. The lid and the basin may be fitted with flanged ports via which a liquid solvent may fill and drain, respectively, and auxiliary ports for gas flow or other uses. Within the basin may be a smaller cylindrical perforated basket rotor centrally-mounted on a spindle driven from beneath via a belt or a direct coupling to the motor. The spindle may be dynamically sealed to inhibit liquid intrusion into the rotor bearings, and therefore the basin may be filled (i.e flooded) with a solvent, submerging the basket and its contents. The basket rotor may conventionally include a fabric liner or a liquid-permeable bag, which may contain a pulverized biomass from which compounds may be extracted into the solvent. The basin floor and/or wall may be hollow and externally ported to allow liquid flow for thermal control or static vacuum space for insulation, similar to a thermos.

However, conventional centrifuges may be difficult or unable to balance at higher RPMs when used in biomass applications, which may have naturally-uneven load densities. Such imbalances may induce potentially damaging vibrations to the system if operated notwithstanding. Their lid seals may be inadequate for use with sticky resins, such as that of *Cannabis*, which may be exacerbated by the inadequate drainage of liquid splashed onto the lid. There may be no safe sensor probe locations for temperature, liquid level, or other process monitoring equipment. With incomplete drainage from the basin, conventional systems may exhibit holdup volume and residue buildup. Such conventional systems may also exhibit incomplete solvent and extracted product recovery from spinning (e.g., some designs invert the rotor cylinder aspect ratio to minimize vibration, sacrificing radial force, meaning that even a longer run does not avoid redepositing dissolved products in biomass). In conventional applications, due to these and other deficiencies, extended soak and agitation times may be required for adequate extraction, yet still fail to collect a significant portion of the products.

Conventional centrifuges may have horizontal, pivoting lids, where liquid may be susceptible to splashing onto the underside of the lid during use and adhere there due to surface tension. When the lid is moved towards a non-horizontal open position, the adhered liquid may run along the underside and drip off the lowest edge of the lid. Much of the dripping liquid may tend to land outside of the basin on the exterior of the machine and/or the lab floor.

Implementations of centrifuges may address some or all of the problems described above. Centrifuges may include a basin to contain a solvent. The centrifuge may further include a circular basket rotor disposed within the basin to contain biomass. The centrifuge may further include a lid connected to the basin via a hinge and configured to selectively close and seal the top opening of the basin. The centrifuge may further include a balancing ring to counterbalance contents of the basket. The balancing ring may include two or more spherical weights and a track or race configured to contain the two or more spherical weights and configured to permit the two or more spherical weights to move within the track or race while the centrifuge basket rotor is spinning, thereby counterbalancing the contents of the basket.

Centrifuges may overcome some or all of the problems described above by enabling use of the minimum amount of solvent necessary to cover the biomass (e.g., two to four times more solvent than required to efficiently dissolve and mobilize the solvent soluble products contained in the biomass). Implementations may provide for an ability to vary a batch size and solvent ratios for extraction of different grades of raw product types without negatively impacting extraction efficiency or effectiveness. Further, implementations may provide for an ability to rinse the product (instead of or after soaking/agitating and draining) in situ with spinning liquid recovery for maximum yield, without additional attachments or additional processing time.

Coupling rotation of the bag with the basket with the lid ring may improve effective agitation (i.e., liquid turbulence between biomass particles) over conventional centrifuges, which simply permit a bag and biomass to float within the liquid. Coupling the biomass movement with the basket, directly, (e.g., via at least one cross baffle; 180 degree wall across the diameter) may improve real agitation (i.e., forced countercurrent flooded extraction). These two couplings may improve biomass wetting and mobilization of product solutes, which may yield higher wash (e.g., bulk, main, flooded, soak & agitation extraction) efficiency as well as subsequent spinning product solution recovery (e.g., by dissolving maximum product solutes).

Distributing the solvent evenly across the biomass volume (e.g., via a central perforated tube containing mesh layers according to inlet solvent flow rate and spin speed) may improve rinse efficiency (e.g., ratio of mass product removal to mass solvent required). This may improve yield of residual product solutes after passive draining and active spinning (e.g., wringing out) the liquid volume held up in the biomass from the soak.

Residual product solutes may refer to all of the solvent-wet compounds, almost entirely in the form of saturated solvent tincture that is leftover & re-deposited due to surface tension and friction on the vast surface area of the rough biomass particles. Rinsing may refer to a continuous flow to mobilize this superficial residue.

Merely flooding and spinning out the system may provide for even distribution of the residue throughout the biomass. This can be addressed by implementations herein by ensuring a rinsing stream flows over the biomass substantially equally.

In highly-selective extractions, equal temperature exposure and solvent residence time for all extracted material may be implemented. This even distribution of flow may be accomplished by covering all biomass evenly at the same time utilizing implementations herein. Implementations herein may effect this by exhibiting a short-wide aspect ratio, which may provide for higher solvent stripping power at lower speeds than conventional implementations, since tall-thin volumes may hold the solvent on the different areas of the biomass for significantly different durations.

A chamfered lid seal and spill guard may include an underside of the basin lid machined with a convex chamfer to fit within the basin rim's concave chamfer and a rubber (e.g., fluorosilocone) sealing cord inset within a dovetail groove alongside the underside of the lid where the convex chamfer meets the horizontal outer lip of the lid. This may provide, in combination with manual clamps and a magnetic safety interlock latch opposite the hinge, a clean, drip-free sealing edge for the liquid basin. The chamfered lid seal and spill guard may further include a flat metal strip welded along half of the internal (e.g., bottom) lid circumference, centered with the lid opening hinge, and shaped with a pouring spout at its middle. Any extraction solution splashed up onto the bottom of the lid while closed may thereby slide along the underside of the lid and into the curved metal guide to be directed and poured back into the basin at the edge closest to the hinge when lid is opened. This may eliminate the conventional problem of spillage along the rim and motor-side outer wall of the basin.

A graded basin floor (i.e., bottom) and drain may include the floor of the basin being raised above the platform (e.g., to provide insulated vacuum jacket space connected to the jacket space inside of the basin wall) and welded inside the basin to the cylindrical basin wall at a slope of, for example, at least 1 inch down for every 10-12 inches across (i.e., an 8.3% to 10% grade), to its lowest point, where the drain hole may be located. The drain hole may include a tube leading down through the platform to a sanitary flange beneath the platform. The grade may enable complete drainage of the basin, thereby improving yields, minimizing product waste residue and cleaning downtime.

A conical flow inlet may guide a flow of incoming solvent to the center of the perforated solvent distributor tube, filling the tube for equal or substantially equal distribution of solvent across the entire depth of biomass in the spinning basket.

A perforated solvent distributor, which may include a perforated center tube and optional mesh packing, may effectively distribute in-flowing solvent rinse from the center of the biomass substantially equally horizontally across the entire depth of biomass in the basket (i.e., across the top, middle and bottom), as the basket rotor spins. This may improve extraction efficiency by dilution rinsing out any pockets of compound-rich solvent trapped in the convoluted volume of biomass, as well as rinsing off any extract that was redeposited on the vast surface area of biomass particles during the prior spin dry. This may reduce or limit total solvent residence time. Effective rinsing may increase compound extraction by an order of magnitude or more (e.g., 3% residual in biomass may be reduced to 0.3% residual or less). Even distribution of the rinse solvent by the perforated solvent distributor may reduce the amount of solvent required for an effective rinse.

Perforated baffles (e.g., separating the basket into two halves or four quadrants) may increase shear contact between solvent and biomass by forcing the lateral movement of biomass through the solvent, leading to greater extraction efficiency. The baffles in tandem with the locking ring may enable the agitation step of alternating forward/reverse basket rotation to provide the most effective and time-efficient extraction. Customizable baffle subassemblies may provide operators greater flexibility to run smaller batch sizes as needed (e.g., two baffles at 180 degrees for full basket or four baffles at 90 degrees for half-full basket as two opposite quadrants). This may also help with load balancing. Various shapes or sizes of mesh bags can be used as needed or desired, although optimal loading may be achieved using custom half and quarter cylinder bags.

A basket lid ring (e.g., the bag locking ring) may provide for coupling biomass from the bags to the motion of the basket rotor to spin at the same speed and direction as the basket, regardless of the surrounding liquid momentum, thereby forcing biomass through the solvent instead of letting it float in the solvent and move along with (e.g., relatively static in relation to) the body of liquid. This may increase the effectiveness of agitation and overall extraction efficiency. The lid ring may also provide a barrier to the binormal force, which tends to push the biomass, bags, and liquid vertically upward along the inside of the basket wall. The lid ring may retain the bag in place and increase the horizontal outward flow of liquid through the biomass during spin-drying.

A coarse mesh-lined basket may provide a thin, yet supportive network of larger-gauge filament mesh holding biomass and fine mesh bag material just off the flat perforated surface of the basket wall. This may induce capillary action for greater solvent removal during high-speed spin cycle, and smoother liquid flow may effectuate less blow-drying (e.g., concentrating of solution which increases residual products) in biomass.

A dynamic balancing ring (e.g., the spherical mass race) may provide for, as spin velocity increases, shifting the weight inside the ring as required for balance, approximately 180 degrees across from overweight regions of load inside the basket volume. Any natural variations in biomass density, and even most common weight loading errors may be quickly counterbalanced during the initial acceleration of the rotor. This may eliminate costly stops and starts to rebalance loads and allow a safe smooth run-up to maximum spin-drying speeds.

FIG. 1 illustrates a perspective view of a centrifuge 100, according to an embodiment. The centrifuge 100 may provide, for example, for enhanced separation of product solution (e.g. tincture) from biomass in botanical extraction applications. The perspective view may illustrate a configuration of components and subsystems of the centrifuge 100.

The centrifuge 100 may include a bottom plate 110 disposed atop of four feet 112. Each of the feet 112 may include a spring-action vibration-dampening mount 114, which may be bolted in place to an extraction facility floor. An outer wall 116 of the basin 118 may be rigidly attached to the bottom plate 110. A top lid 120 may be hingedly attached through a hinge mating plate 121 to the outer wall 116 such that it rotates about a hinge axis 122 between a closed position as shown and an open position. An air cylinder 123 may be provided between the hinge mating plate 121 and bottom plate 110 to actuate and/or dampen the opening and closing of the top lid 120.

Figure 2:
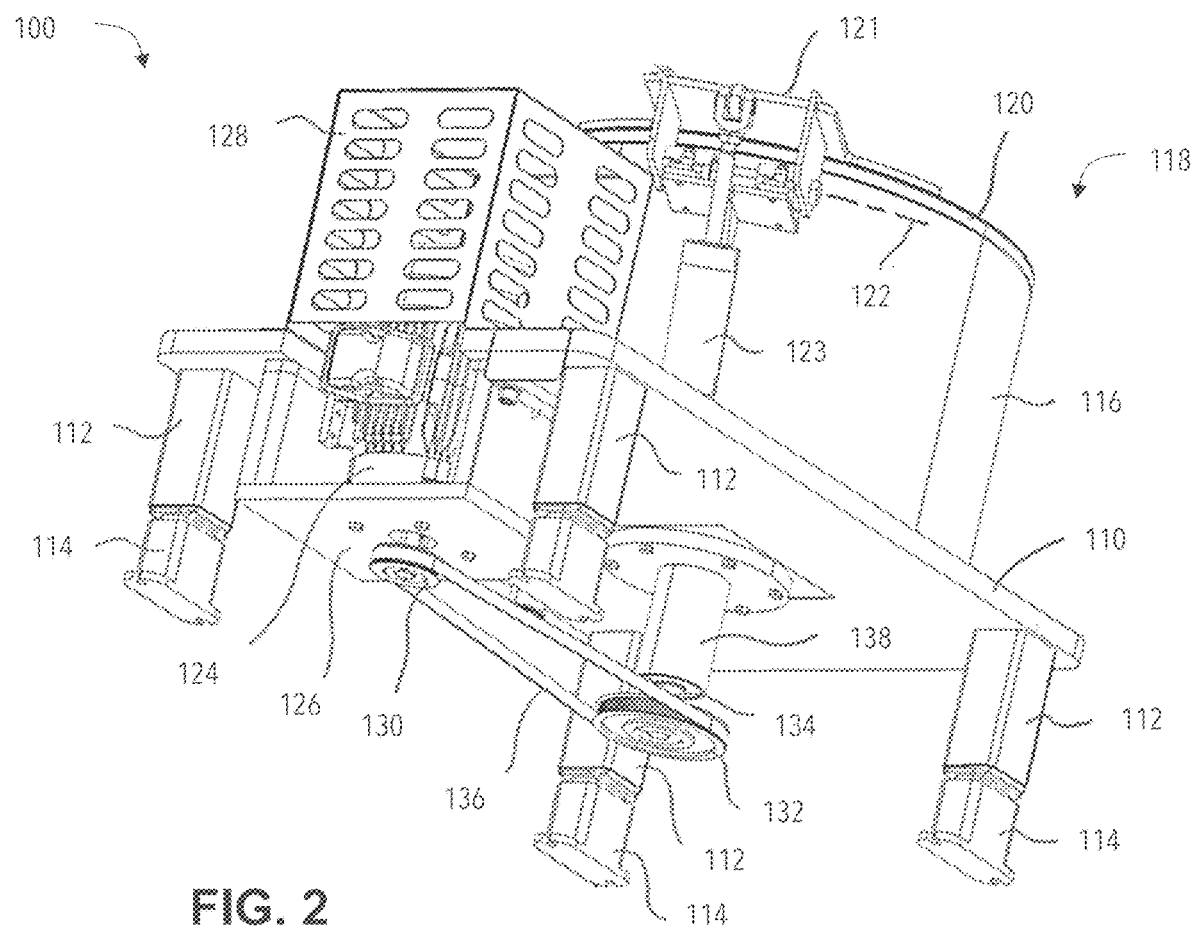
FIG. 2 illustrates a perspective view a centrifuge, according to an embodiment.

FIG. 2 illustrates a perspective view a centrifuge 100, according to an embodiment. The perspective view may further illustrate a configuration of components and subsystems of the centrifuge 100.

An electric motor 124 may be mounted to a motor mount 126, which in turn may be mounted to the underside of the bottom plate 110 and covered with a motor shield 128. A drive sheave 130 may be mounted on the output shaft of the motor 124, and a driven sheave 132 may be mounted on a 2.5-inch diameter hardened precision stainless steel shaft 134, such that the motor 124 can rotate a shaft 134 through a belt 136. The shaft 134 may be rotatably mounted in a bearing housing 138 affixed to the bottom side of the bottom plate 110 and extend up into the basin 118 to rotate the basket rotor assembly.

Figure 3:
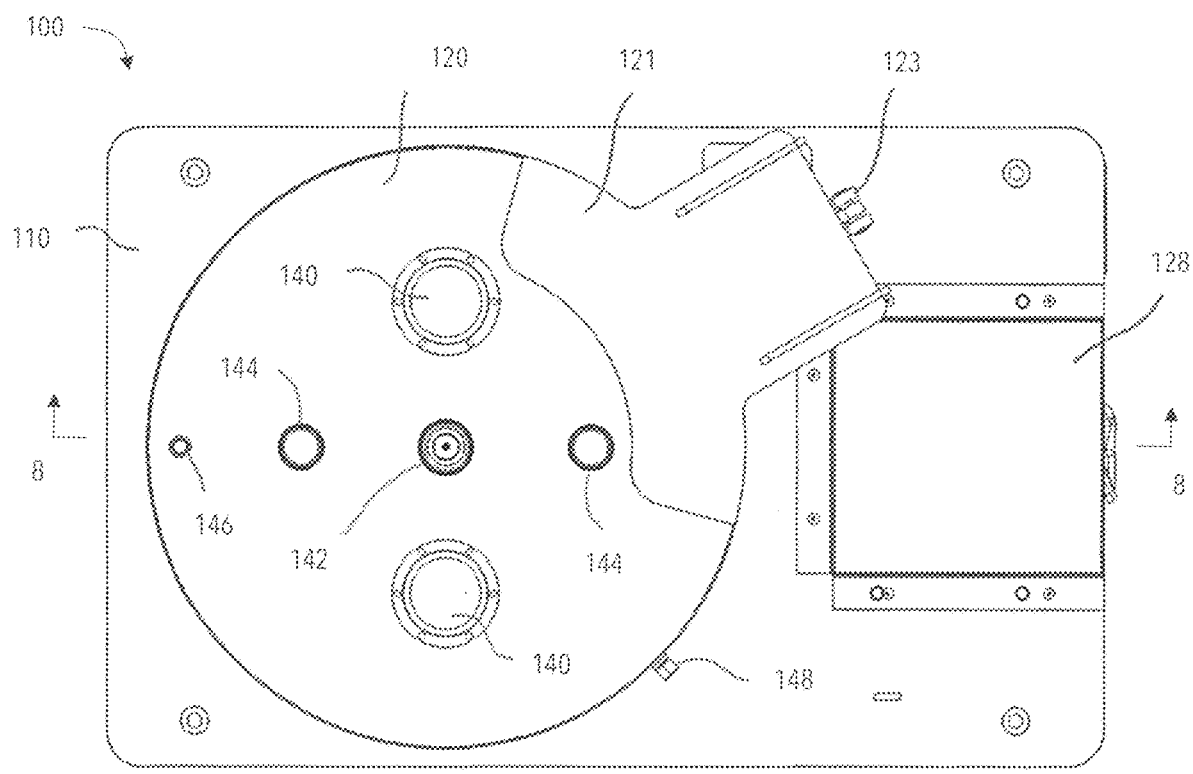
FIG. 3 illustrates a top view of a centrifuge, according to an embodiment.

FIG. 3 illustrates a top view of a centrifuge 100, according to an embodiment. The top view may further illustrate a configuration of components and subsystems of the centrifuge 100.

The top lid 120 may be provided with two sight glass sub-assemblies 140, each having, for example, a 4-inch viewing diameter for viewing the interior of the basin 118 when the top lid 120 may be closed. A 2.0 to 2.5-inch tri-clamp sanitary tube fitting 142 may be provided in the center of the lid 120 for attaching supply line piping to fill the basin 118 with liquid. Two 2.0-inch tri-clamp sanitary tube fittings 144 may also be provided in the lid 120 as shown for attaching additional piping or accessories. In some embodiments, a stainless-steel threaded pipe fitting 146 may also be provided in the lid 120, and a vacuum jacket pump-out port 148 or opposed thermal liquid ports may be provided in the outer wall 116.

Figure 4:
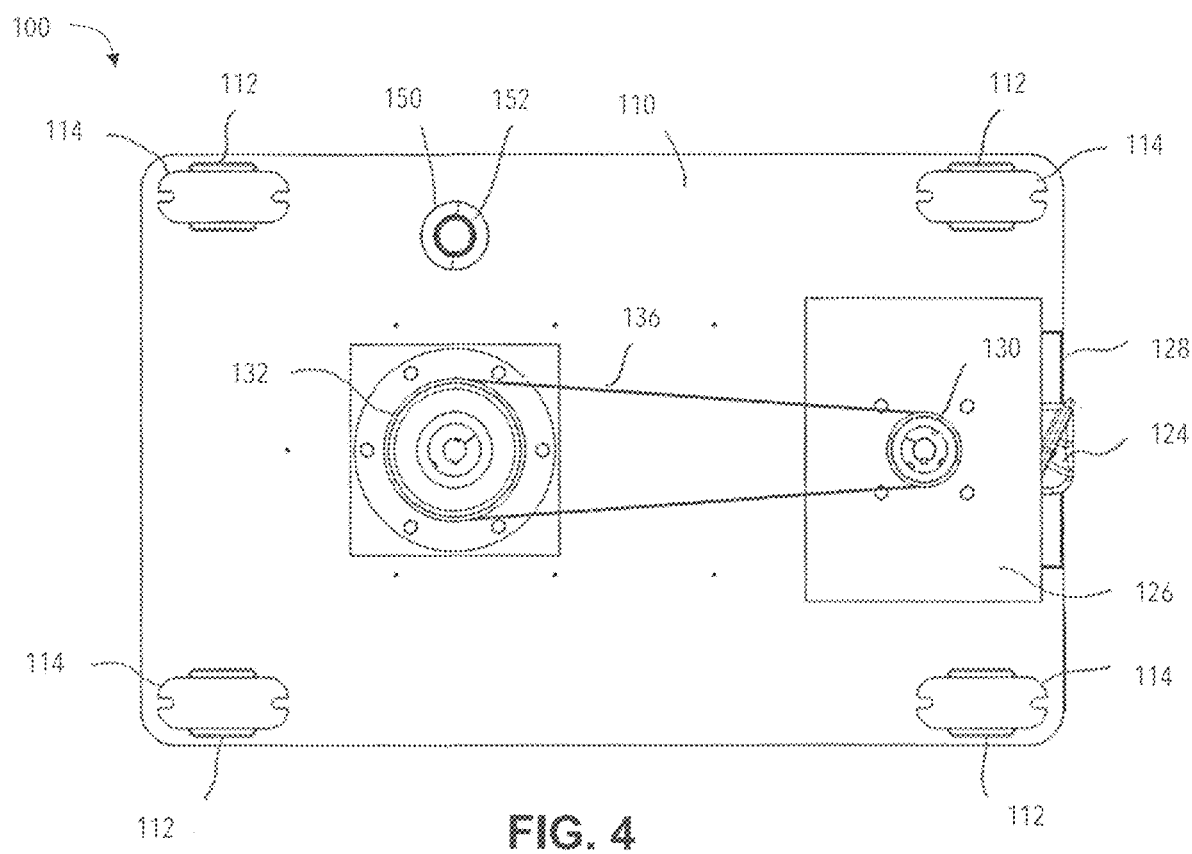
FIG. 4 illustrates a bottom view of a centrifuge, according to an embodiment.

FIG. 4 illustrates a bottom view of a centrifuge 100, according to an embodiment. The bottom view may further illustrate a configuration of components and subsystems of the centrifuge 100.

A 3.0-inch schedule 10 pipe drain line 150 may be attached to the interior bottom wall (i.e., floor) of the basin 118 and extend through the bottom plate 110. A high-polish quick-clamp sanitary tube fitting 152 may be provided on bottom end of the drain line 150 for mating with laboratory plumbing to allow liquid to be drained from the basin.

Figure 5:
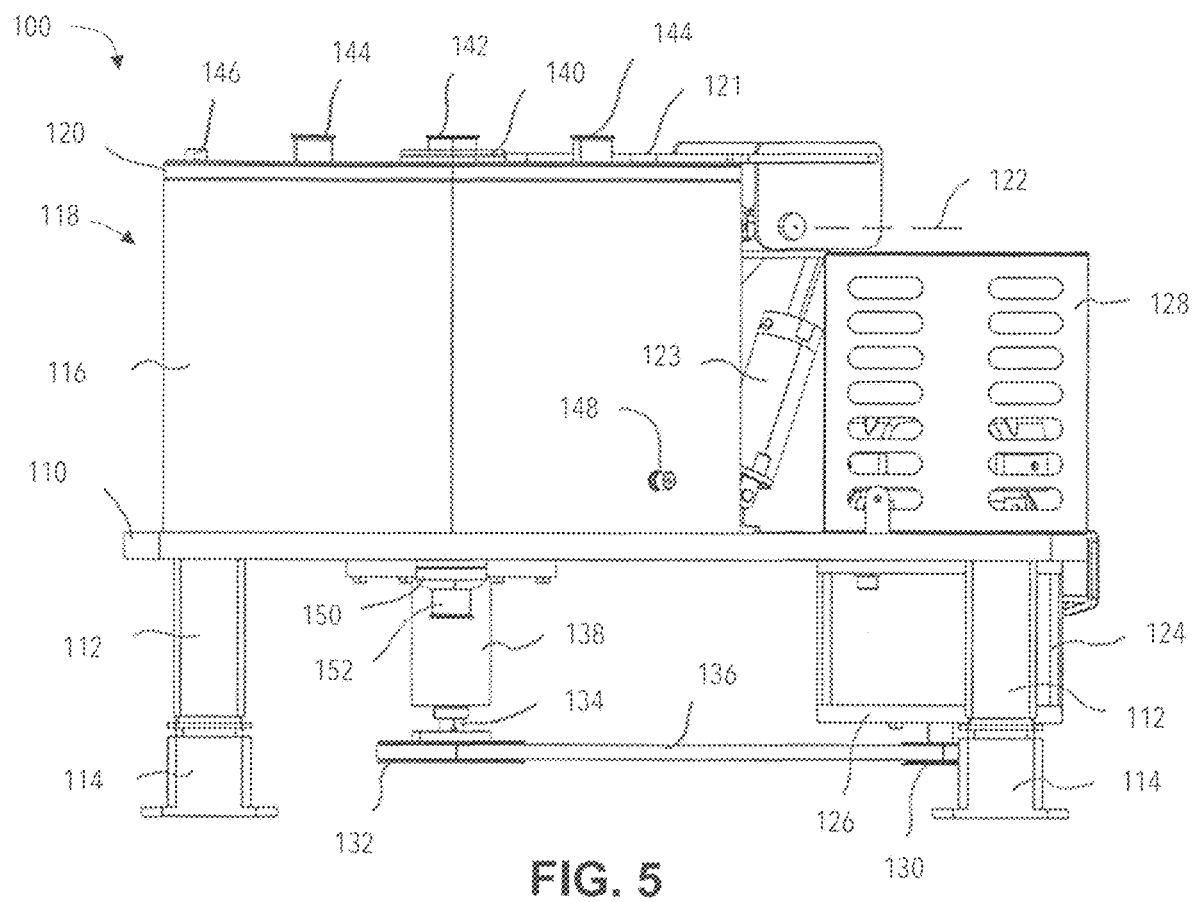
FIG. 5 illustrates a drain-side view of a centrifuge, according to an embodiment.

FIG. 5 illustrates a drain-side view of a centrifuge 100, according to an embodiment. The drain-side view may further illustrate a configuration of components and subsystems of the centrifuge 100. The stainless-steel threaded pipe fitting 146 may be provided in the lid 120, and the vacuum jacket pump-out port 148 may be provided in the outer wall 116. In other embodiments, an inlet port for thermal liquid may be provided in place of the pump-out port 148, while the outlet port for thermal liquid is provided on the opposite side of the basin, near the top rim.

Figure 6:
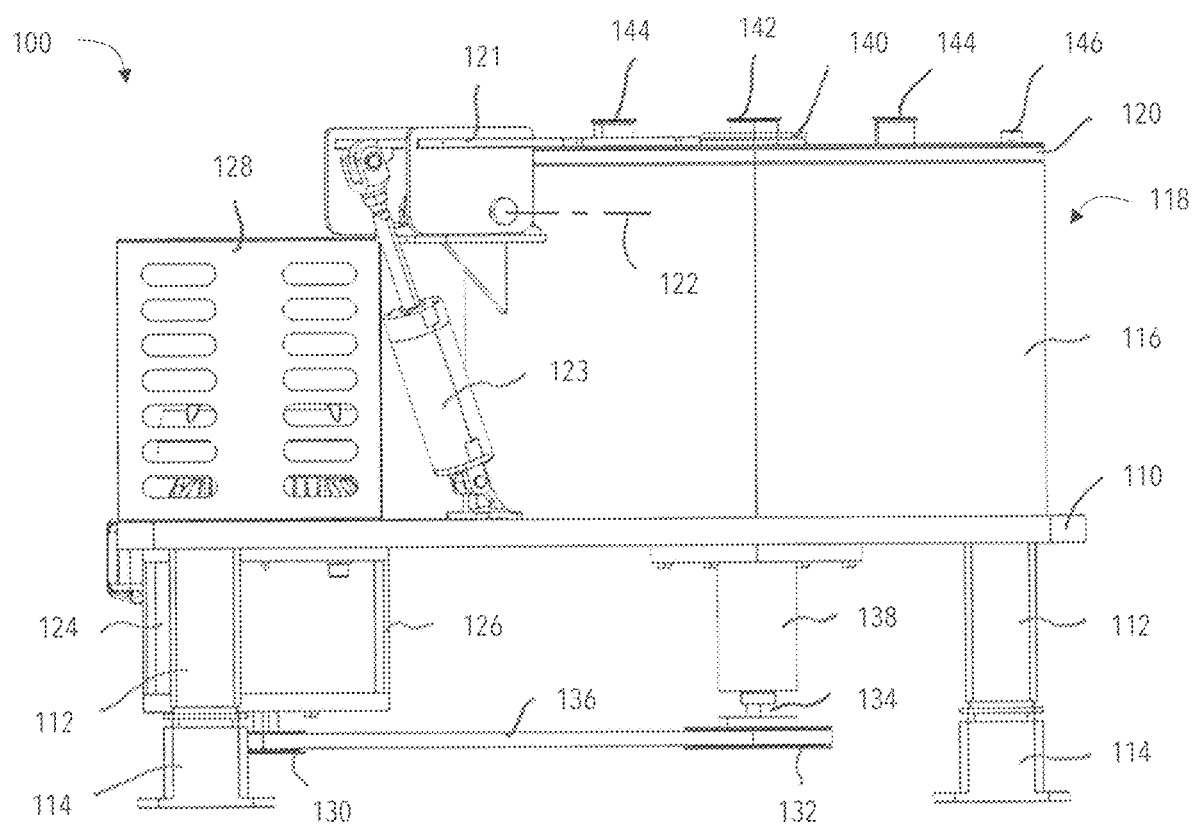
FIG. 6 illustrates a hinge-side view of a centrifuge, according to an embodiment.

FIG. 6 illustrates a hinge-side view of a centrifuge 100, according to an embodiment. The hinge-side view may further illustrate a configuration of components and subsystems of the centrifuge 100.

The hinge-side view of the centrifuge 100 illustrated in FIG. 6 may provide further detail as to the air cylinder 123. It will be understood that the air cylinder 123 may be provided as a hydraulic cylinder, a non-sparking electric solenoid and/or a pneumatic piston in various other embodiments. The air cylinder 123 may be provided between the hinge mating plate 121 and bottom plate 110 to actuate or dampen the opening and closing of the basin lid 120. In some embodiments, the lid 120 may be held closed by its own weight and/or pressure applied by an air cylinder 123.

Figure 7:
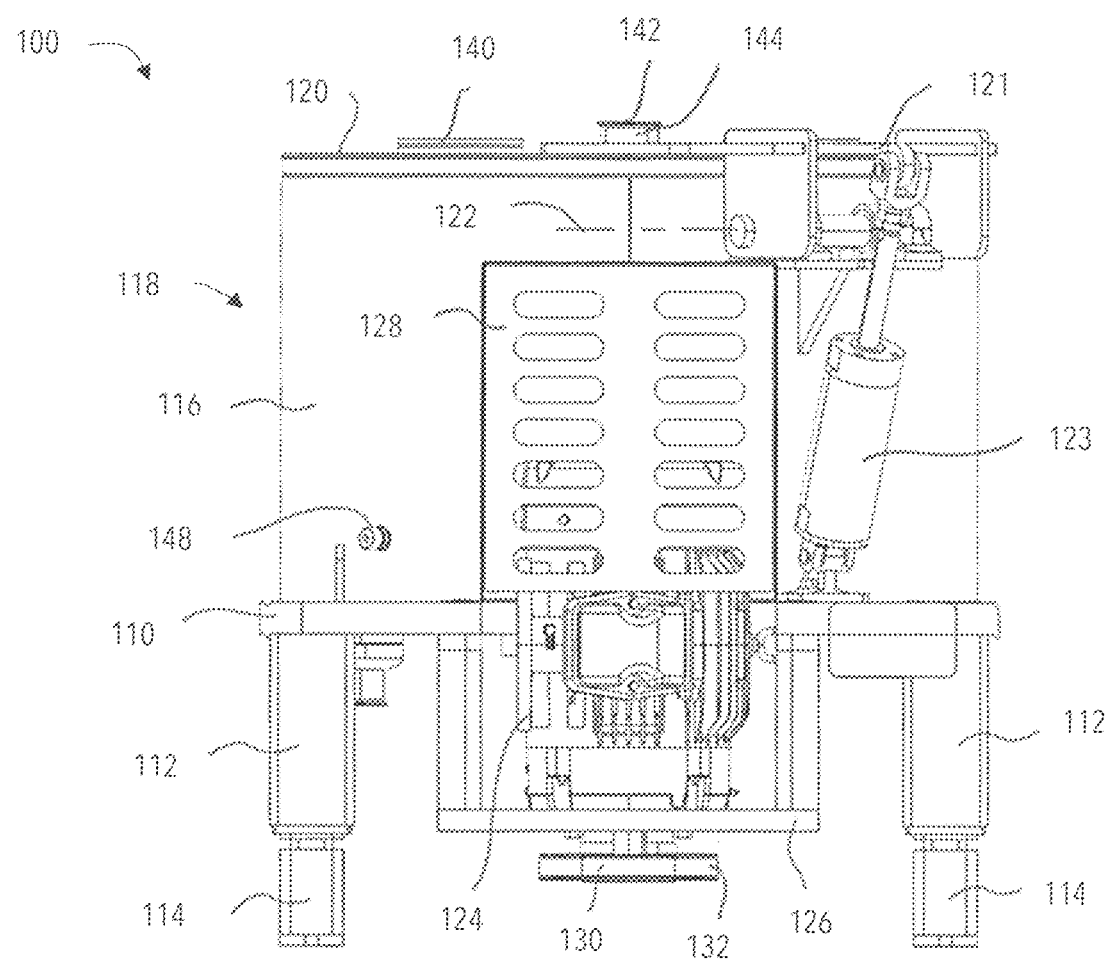
FIG. 7 illustrates a rear view of a centrifuge, according to an embodiment.

FIG. 7 illustrates a rear view of a centrifuge 100, according to an embodiment. The rear view may further illustrate a configuration of components and subsystems of the centrifuge 100.

The electric motor 124 may be disposed at least partially beneath the bottom plate 110. The electric motor 124 may further be at least partially disposed within a ventilated cover housing 128. The electric motor 124 may have a shaft operatively connected to a driving sheave 130 for rotating a belt-driven sheave 132, thereby causing the basket rotor of the centrifuge 100 to spin.

Figure 8:
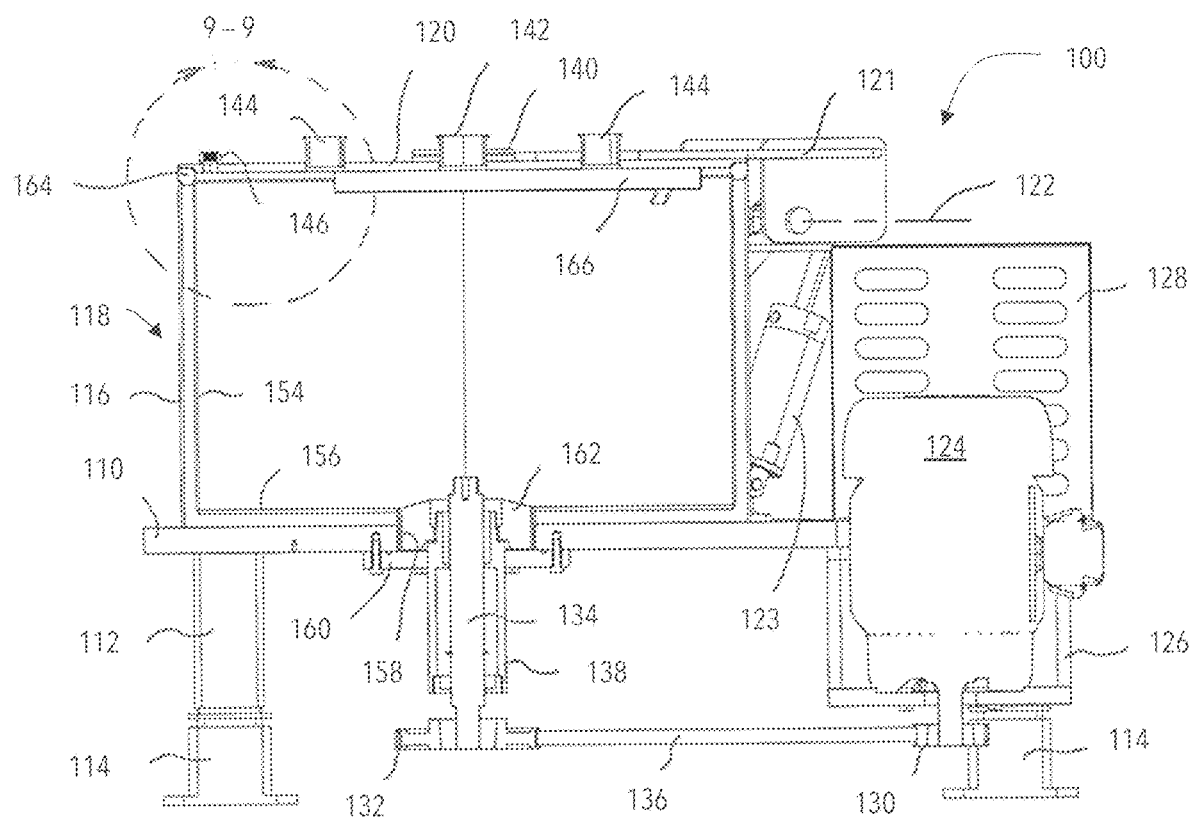
FIG. 8 illustrates a cross-sectional view of a centrifuge, according to an embodiment.

FIG. 8 illustrates a cross-sectional view of a centrifuge 100, according to an embodiment. The cross-sectional view may be taken along, for example line 8-8 of FIG. 3 and may further illustrate a configuration of components and subsystems of the centrifuge 100.

The basin 118 may have an inner vertical wall 154 in addition to the outer vertical wall 116 and spaced apart therefrom. Both the inner and outer walls 154 and 116 may remain stationary during operation of the centrifuge 100. The outer vertical wall 116 may be welded or otherwise attached to the bottom plate 110. The inner vertical wall 154 may be welded or otherwise attached to the concave chamfered basin rim 164 and to the inner bottom wall 156 (e.g. basin floor). A bottom tube 158 may also be welded or otherwise attached around, for example, an 8-inch diameter hole through the bottom wall 156. In this exemplary embodiment, the bottom tube 158 may be, for example, 2.5 inches tall and have a wall thickness of, for example, 0.120 inches. The bottom tube 158 may pass through the bottom plate 110 and support the inner basin on the bearing housing attachment flange 160. In this exemplary embodiment, a void plug 162 made of high-density polyethylene (HDPE) resides within the bottom tube 158. A chamfered ring 164 may be provided as a solid top rim to interconnect the top edges of the inner vertical wall 154 and the outer vertical wall 116 to form a double-walled (e.g. jacketed) basin 118, as will be presented in more detail in detail 9-9. A drip guard assembly 166 may be located on the bottom surface of the top lid 120.

Figure 9:
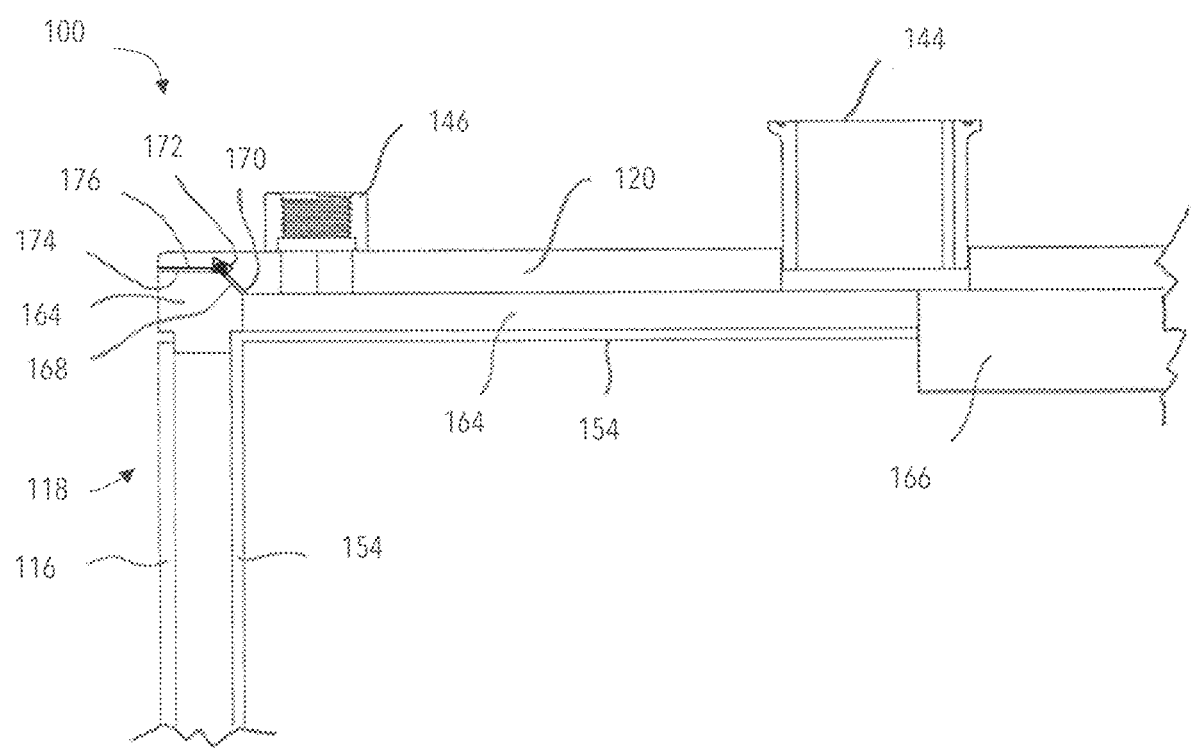
FIG. 9 illustrates a detail of a centrifuge, according to an embodiment.

FIG. 9 illustrates a detail 9-9 of a centrifuge 100, according to an embodiment. The detail view may further illustrate a configuration of components and subsystems of the centrifuge 100.

The top ring 164 may be welded or otherwise rigidly attached to both the inner vertical wall 154 and the outer vertical wall 116. The top ring 164 may be provided with a beveled surface 168 for engaging with a mating beveled surface 170 on the underside of the lid 120 to form a liquid-tight seal there between. In this embodiment, the beveled surface 168 may be inwardly facing (i.e., concave chamfered), the beveled surface 170 may be outwardly facing (i.e., convex chamfered), and both surfaces may have an angle of, for example, 45 degrees. In other embodiments, the angle may be, for example, between 20 and 70 degrees. A groove 172 may be formed in the beveled surface 170 as shown for receiving an O-ring and/or other sealing member. In other embodiments, a groove 172 may be formed in the beveled surface 168 in addition to or instead of in the beveled surface 170. A flat surface 174 may be provided on top of the ring 164 for engaging with a mating flat surface 176 on the underside of the lid 120. In some embodiments, the flat surface 176 may have a surface area that may be, for example, at least two or three times the surface area of the beveled surface 170 (e.g., not including the surface area removed from the beveled surface 170 by the groove 172). In some embodiments, the lid 120 may be held in the closed position by one or more manual or automatic releasable latches (e.g., metal clasps and/or a magnetic safety interlock) along the periphery of the lid 120 and spanning between the outer basin wall 116 and the top surface of the lid 120.

Figure 10:
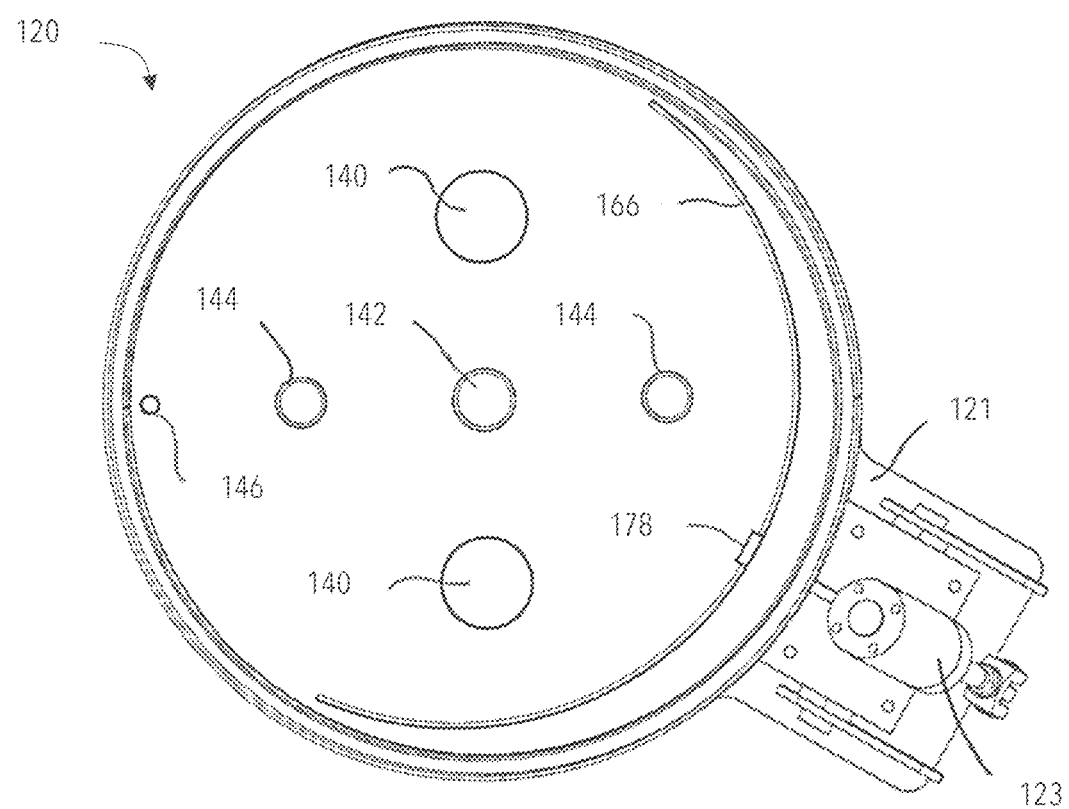
FIG. 10 illustrates a lid assembly, according to an embodiment.

FIG. 10 illustrates a lid assembly 120, according to an embodiment. The lid assembly 120 may provide containment of and access to the contents of the basin 118.

The lid 120 may be provided with an arcuate drip guard assembly 166. In this exemplary embodiment, the drip guard assembly 166 may be provided with an exit chute 178. The drip guard assembly 166 serves in part to capture adhered liquid, divert it to a central location, and allow the liquid to run through the exit chute 178 back into the basin 118 upon opening the lid. The drip guard assembly 166 may cover, for example, about 180 degrees of the lid 120, but itself may have an arc of, for example, only 169 degrees, since it may have a smaller diameter than that of the bottom surface of the lid 120 and have a center, which may be offset therefrom. In this embodiment, the drip guard assembly 166 may have a diameter of, for example, 30 inches and the bottom surface of the lid 120 has a diameter of, for example, 33 inches. The curve of the drip guard assembly 166 may be substantially concentric to the interior of the lid assembly 120, forming a crescent gap between the drip guard assembly 166 and an edge of the lid assembly 120. In one example, the crescent gap may be narrow.

Figure 11:
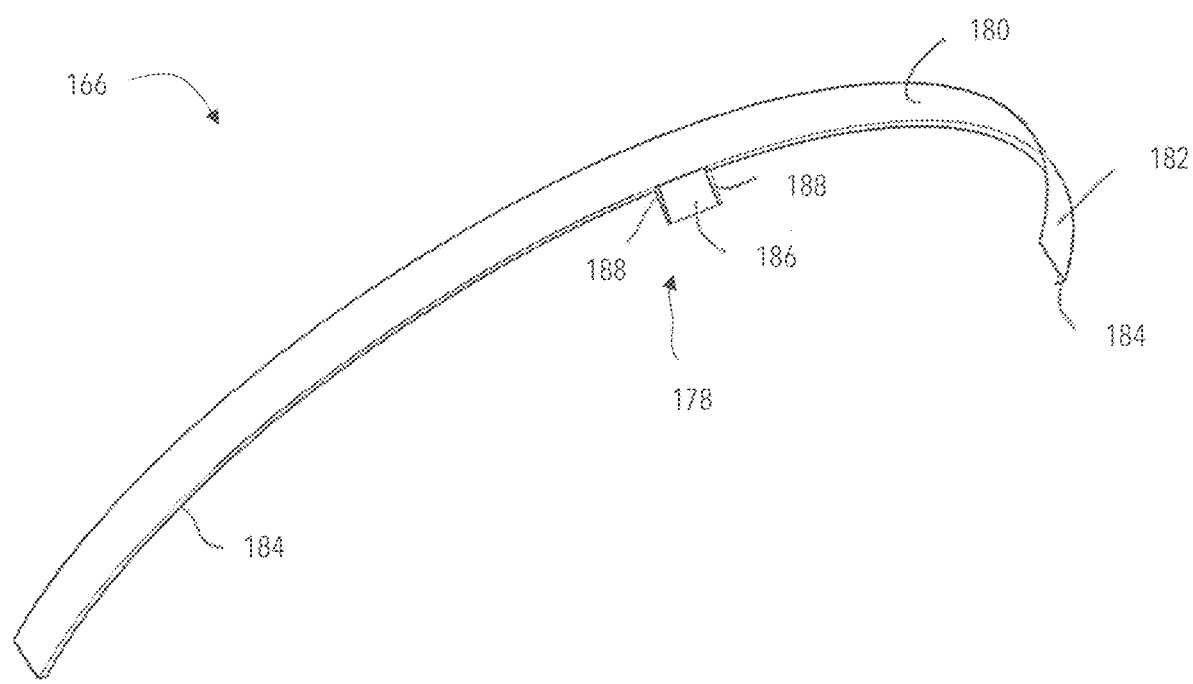
FIG. 11 illustrates a drip guard assembly, according to an embodiment.

FIG. 11 illustrates a drip guard assembly 166, according to an embodiment. The drip guard assembly 166 may serve in part to capture adhered liquid and divert it to a central location and allow the liquid to run through the exit chute 178 back into the basin 118.

The inside surface 180 of the band 182 may be provided with a lip 184 along its lower hanging edge. The upper edge of the band 182 may be welded or otherwise attached to the underside of the lid 120. The lip 184 may divert liquid that may be captured by the band 182 toward the exit chute 178 rather than letting it drip off of the band 182 along its entire lower edge. In this embodiment, the exit chute 178 may be formed by a main ramp 186 that aligns with an inside surface 180, and a pair of rails 188 along each side of the main ramp 186 that align with the lip 184. In this embodiment, the main ramp 186 may be offset from the vertical band 182 by, for example, 30 degrees.

Alternatively, the drip guard assembly 166 may be positioned in a concentric manner just inside the circumference of the lid 120, for example, less than one inch from the seal. The exit chute or spout 178 may have a V-shape or U-shape. All surfaces of the drip guard assembly 166 may be parallel to the interior wall of the basin 154 when the lid 120 may be in the closed position.

Figure 12:
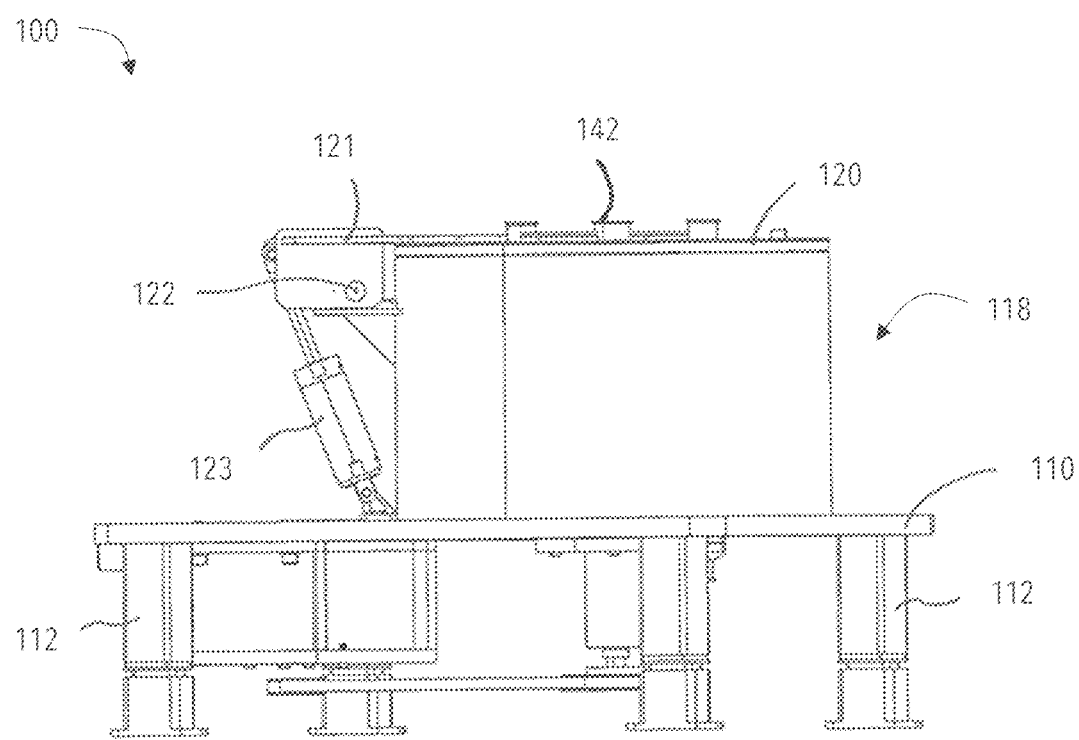
FIG. 12 illustrates a front-side view of a centrifuge, according to an embodiment.

FIG. 12 illustrates a front-side view of a centrifuge 100, according to an embodiment. The front-side view may provide details regarding additional aspects of the centrifuge 100. The centrifuge 100 may be shown with the lid 120 in a horizontal closed position.

In the horizontal closed position, the centrifuge 100 may provide for a container within which a separation process may be conducted without allowing the contents thereof to be emitted into the environment. The lid 120 may be closed by, for example, extending a shaft of the air piston 123, which may be further pressurized to provide a closing force for the lid 120.

Figure 13:
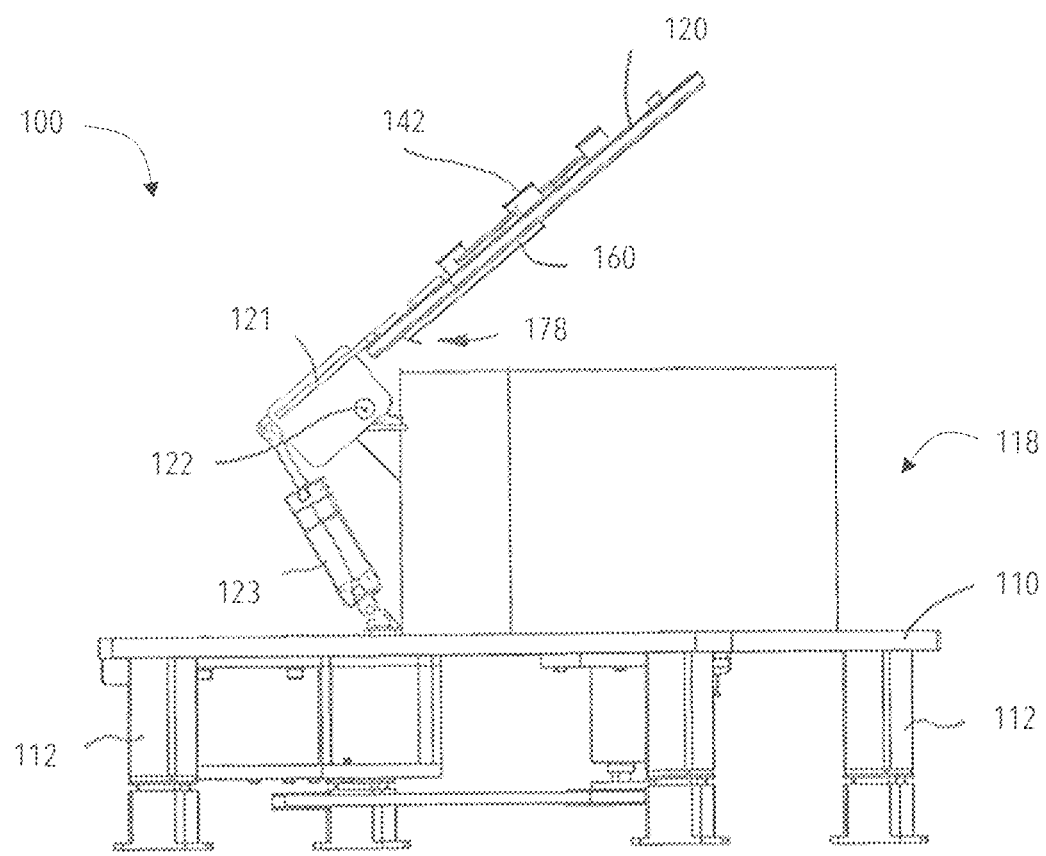
FIG. 13 illustrates a front-side view of a centrifuge, according to an embodiment.

FIG. 13 illustrates a front-side view of a centrifuge 100, according to an embodiment. The front-side view may provide details regarding additional aspects of the centrifuge 100. The lid 120 may be in an upwardly inclined open position. In this embodiment, the lid 120 may open to an orientation that may be, for example, about 60 degrees above horizontal and not open more than this angle. In the fully open position, liquid adhered to the lid underside may run along the inside surface of the lid 120 to be collected by the drip guard assembly 160, and flow through the exit chute 178, returning back into the basin 118.

Figure 14:
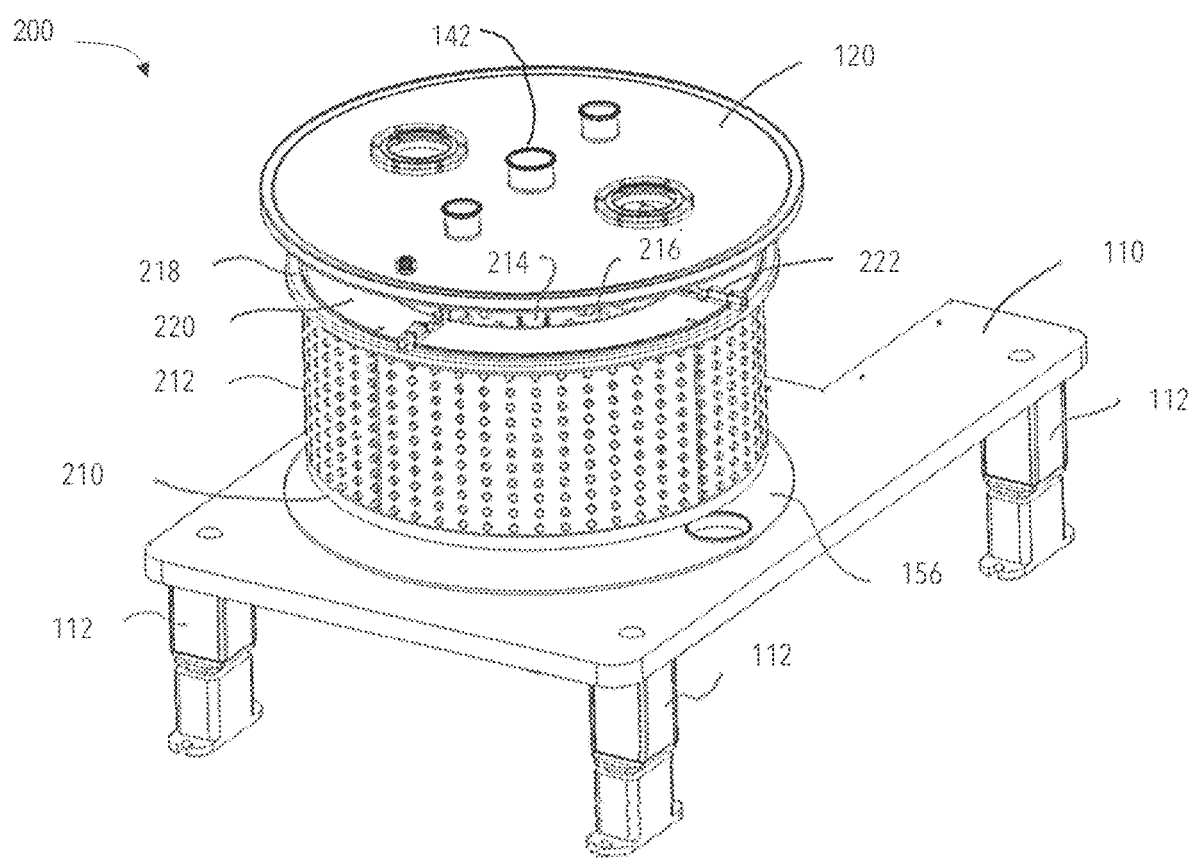
FIG. 14 illustrates an assembled basket rotor system of a centrifuge, according to an embodiment.

FIG. 14 illustrates an assembled basket rotor system 200 inside the basin of a centrifuge 100, according to an embodiment. The basket system illustration may provide further details as to the interior components of the centrifuge 100.

The basket system 200 may reside and rotate within the basin 118 and may include a basket bottom rotor plate 210, a basket shell 212, a center-mounted perforated pipe 214, basket baffles 216, a basket top rim 218, a basket lid ring 220 and four sliding latches 222.

The basket lid ring 220 may be removably located on the just inside top edge of the basket shell 212, flush with the top rim 218, and may extend partway towards the center axis of the basket shell 212. In this embodiment, the lid ring 220 may extend, for example, 4 inches towards the center of the basket shell 212 and have an inside diameter of, for example, 20 inches. The basket shell 212 and rim 218 inner diameter may be, for example, 28 inches. The lid ring 220 may be 1 to 2 millimeters smaller in its outer diameter than the basket rim 218 inner diameter. Therefore, the lid ring 220 may extend, for example, about 29% of the distance between the inside basket diameter and center axis. In other embodiments, the lid ring 220 may extend at least, for example, 15% of the distance and no more than 63% of the distance.

Figure 15:
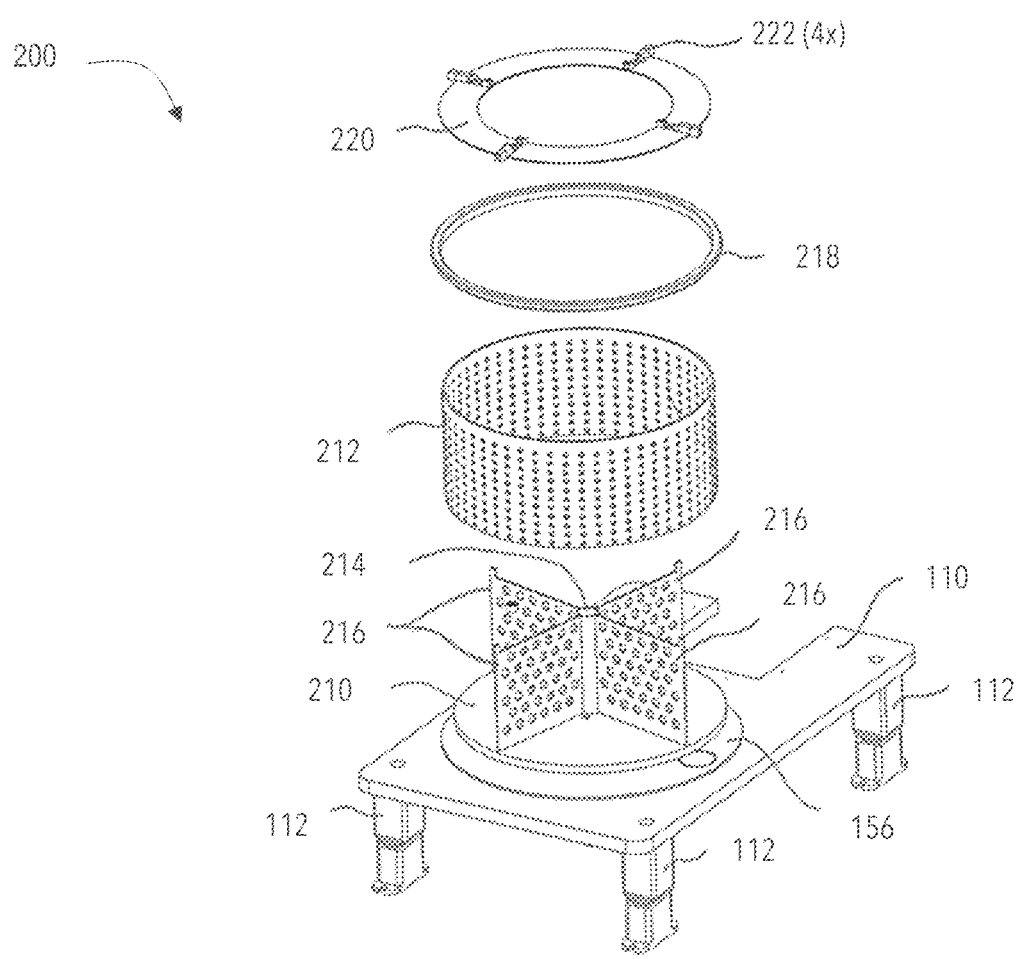
FIG. 15 illustrates an exploded view of a basket system of a centrifuge, according to an embodiment.

FIG. 15 illustrates an exploded view of a basket system 200 of a centrifuge 100, according to an embodiment. The basket system illustration may provide further details as to the components of the basket system of the centrifuge 100. Four removable baffles 216 may reside within the basket shell 212, and releasably attach by tabs in slots to the center-mounted pipe 214, the bottom rotor plate 210 and/or the lid ring 220.

In some embodiments, the basket shell 212 may be formed from, for example, 174 inch thick and 12 inch wide perforated plate. The holes may be, for example, 12 inch in diameter and spaced apart 1 inch on center vertically and 1.5 inch on center horizontally, providing around 37% open area. The baffles 216 may be provided with rows of, for example, ¾ inch diameter holes that are offset from one another, as shown. In some embodiments, the baffles 216 may be made of stainless steel or plastic. The basin 118 may have an inside diameter of, for example, 31 inches and an inside height of 19 inches. In some embodiments, the basket assembly 200 may spin at least 400 RPM. In some embodiments, an agitation cycle may be bidirectional at 50 to 200 RPM (inclusive), and a spin cycle may be unidirectional at 400 to 2000 RPM (inclusive).

Figure 16:
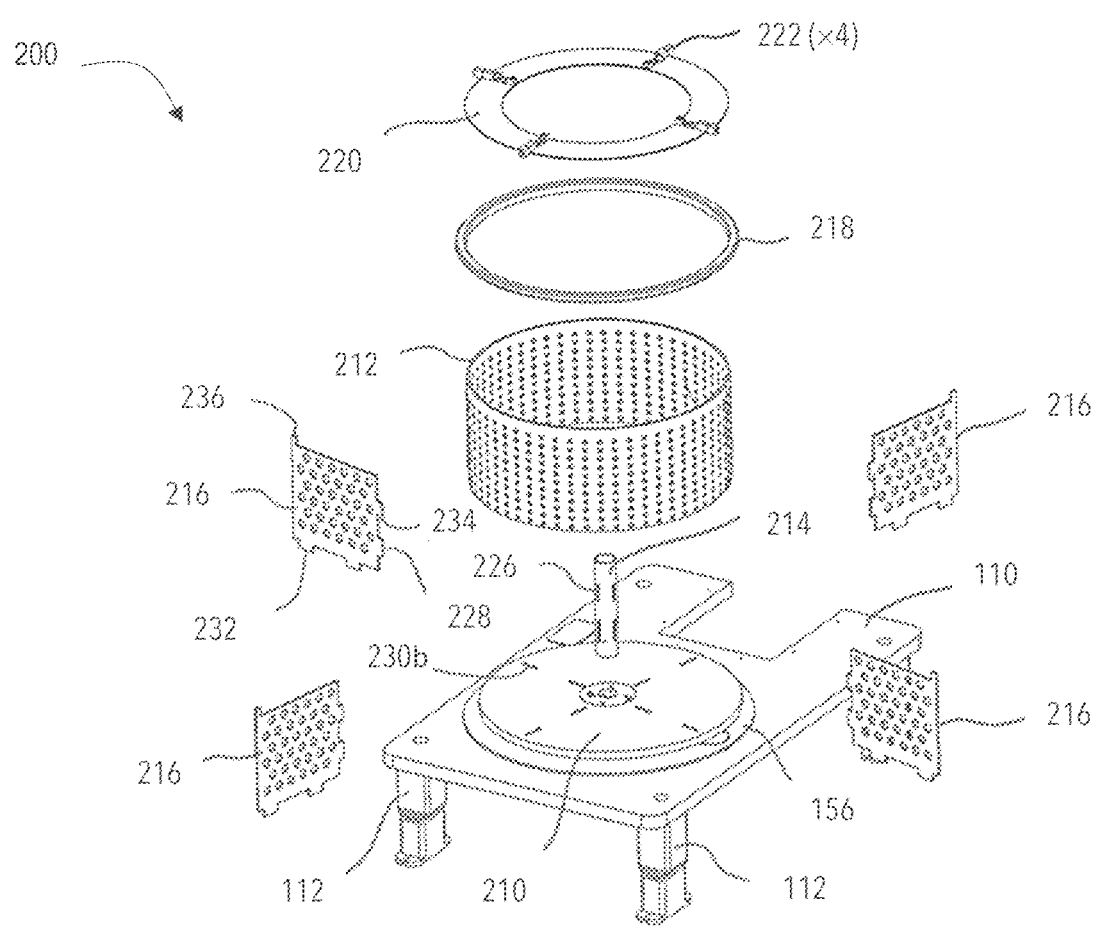
FIG. 16 illustrates an exploded view of a basket system of a centrifuge, according to an embodiment.

FIG. 16 illustrates an exploded view of a basket system 200 of a centrifuge 100, according to an embodiment. The basket system illustration of FIG. 16 may provide further details as to the interior components of the centrifuge 100. The center-mounted pipe 214 may be provided with vertically extending slots 226 for receiving inwardly projecting tabs 228 and 234 on the removable baffles 216. The center pipe 214 may also be perforated to allow liquid to flow downward from the central inlet 142 on the lid 120, into the center pipe 214 and radially outward through the perforations. The bottom rotor plate 210 may be provided with radially extending slots 230b for receiving the downwardly projecting tabs 232 on the removable baffles 216.

Figure 18:
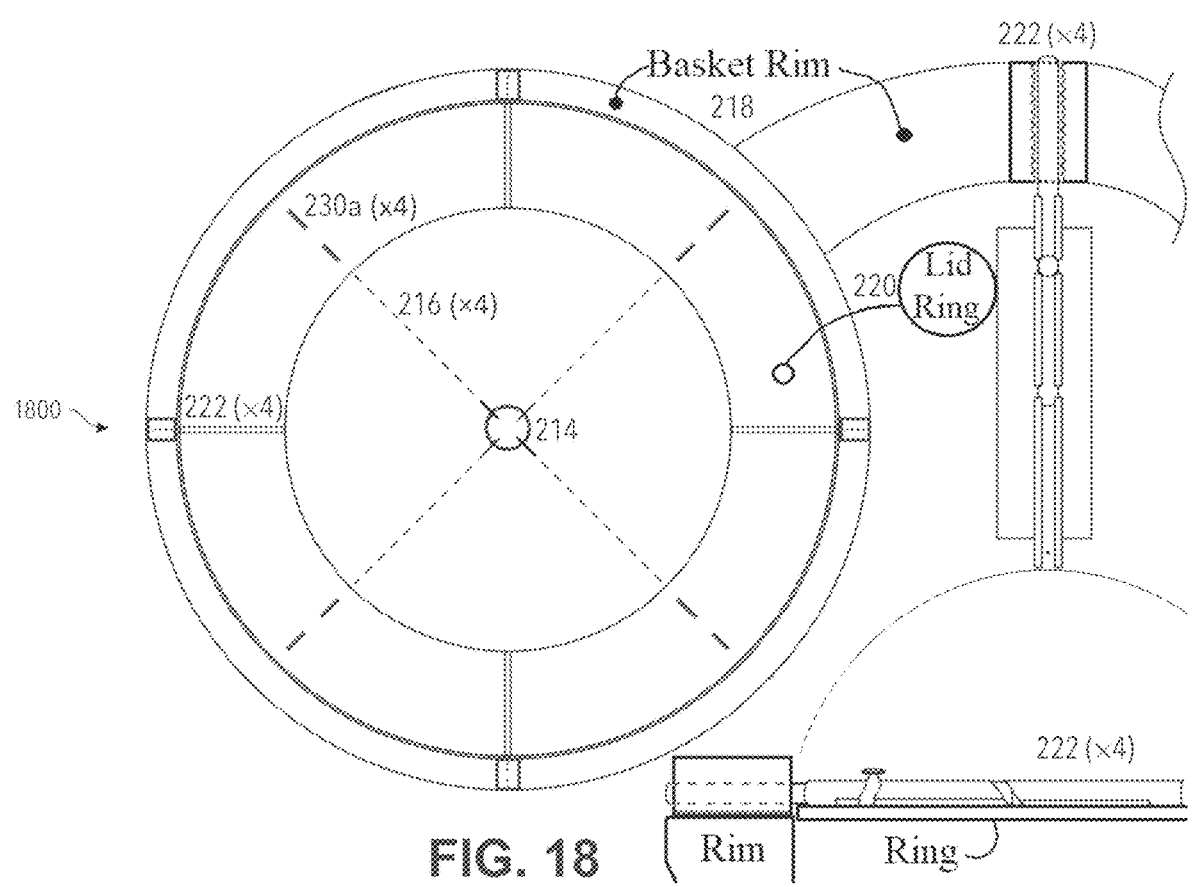
FIG. 18 illustrates overhead and edge views of the basket rim, lid ring with latches, baffles and central distribution tube, according to an embodiment.

The inwardly projecting tabs 228 may include at least one downwardly projecting hook feature 234 for locking into the slots 226 when the baffle 216 may be lowered into place. Each baffle 216 may also include an upwardly projecting tab or tabs 236 along its radially extending horizontal top edge for support in conjunction with the basket lid ring 220, which may include slots for receiving the tabs 230a (as shown in FIG. 18). The baffles 216 may be aligned underneath the basket lid ring 220, each spaced halfway between two adjacent lid latches 222. In other words, if the latches 222 are located at, for example, 0, 90, 180 and 270 degrees around the lid ring 220 as shown, the baffles 216 may be positioned at, for example, 45, 135, 225 and 315 degrees around the lid ring 220. With this arrangement, zero, two, four, or in some embodiments an even number greater than four removable baffles may alternately be placed within the basket shell 212 to divide the basket into compartments. In one example, the compartments may be equally spaced. In some embodiments, an odd number of removable baffles may be used as long as the baffles divide the basket into equally sized compartments. Among other advantages, the baffles can couple the motion of the biomass being processed with the basket rotation to affect agitation. This arrangement allows centrifuge operators to run smaller batches and the baffles 216 can keep the basket load balanced.

Figure 17:
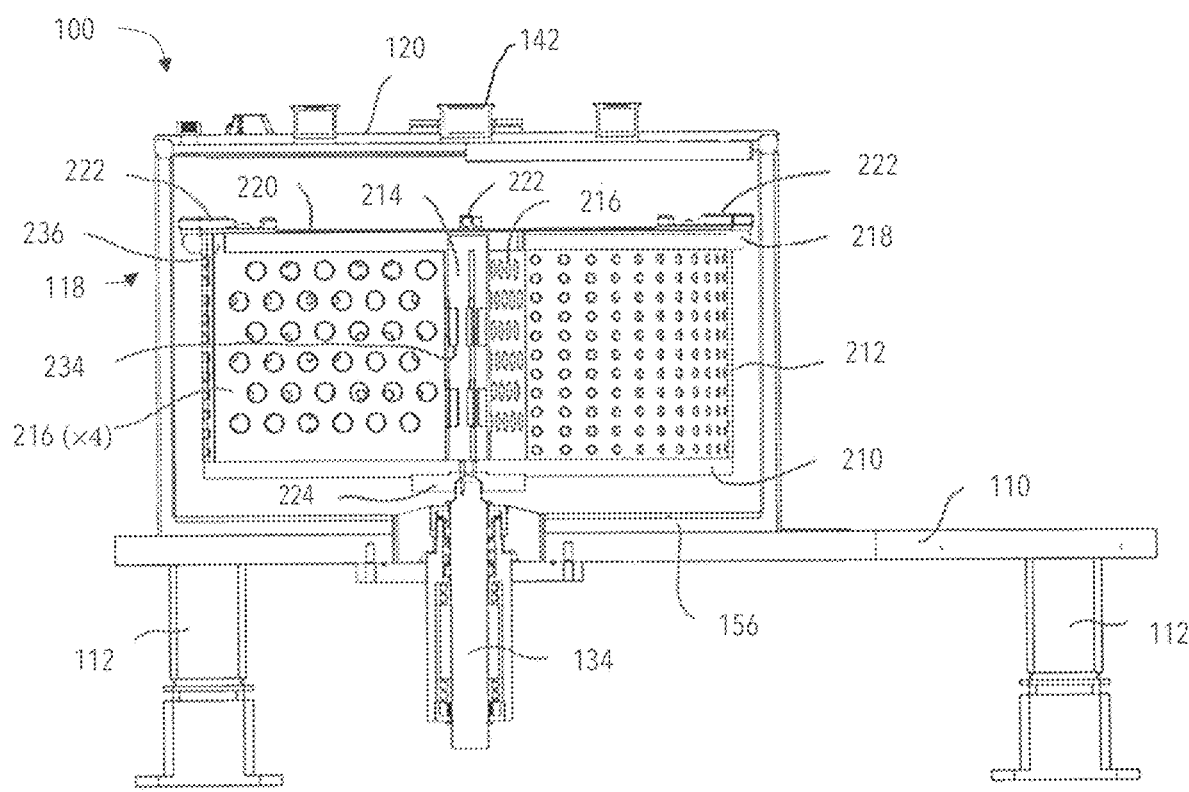
FIG. 17 illustrates a cross-sectional view of a basket system of a centrifuge, according to an embodiment.

FIG. 17 illustrates a cross-sectional view of a basket system of a centrifuge 100, according to an embodiment. The basket system illustration may provide further details as to the interior components of the centrifuge 100.

A 1.5-inch downspout can be mounted on a flange adapter on the central inlet 142 to protrude down through the lid 120 and direct liquid into the perforated center distributor pipe 214. The basket shell 212 may be permanently mounted between the bottom rotor plate 210 and the top ring 218, such as by welding or other attachment means. The entire basket assembly may be mounted to the shaft 134 by the basket rotor mating part 224, which can be threaded onto to the top end of the shaft 134 and bolted onto the bottom side of the bottom rotor plate 210.

FIG. 18 illustrates detailed overhead and edge views of the basket rim, lid ring with latches, baffles and central distribution tube 1800, according to an embodiment.

Each latch 222 may have three main components: a grooved block that may be rigidly attached to the top surface of the basket lid ring 220, a hollowed block that may be rigidly attached to the top surface of the basket top rim 218, and a fastening pin or bar mechanism that slides to releasably connect the two blocks together. When all of the latches 222 are secured, the basket lid 220 may be rigidly held in place above the basket shell 212 for operation of the centrifuge 100. When all of the latches 222 are released, the basket lid ring 220 may be removed, allowing the baffles 216 to be inserted or removed. In some embodiments, the basket lid ring 220 may serve multiple purposes. It may serve to hold the baffles 216 down more securely during use by tabs atop the baffles protruding through slots in the lid ring 220. The basket lid ring 220 may serve to keep mesh bags of biomass being processed from floating upward and partially out of the basket shell 212. The basket lid ring 220 may also serve to counteract the binormal force which normally vectors liquid vertically upward and out of the basket shell 212 during use, and instead direct that liquid horizontally through the biomass for more effective extraction. In some embodiments, a permanent positioning pin may be rigidly affixed to the edge of the lid ring 220 to correspond to a notch in the basket rim 218, keeping the system balanced by allowing the lid ring 220 to be attached in only one specific orientation. In the preferred embodiment, the basket rim 218 is comprised of the dynamic balancing race ring 2800.

The basket rim 218 may be comprised of the dynamic balancing race ring with spherical weights 2800 to provide for dynamic balancing of a centrifuge basket rotor 200 onto which it is affixed as the basket rim 218. The basket rim may be, for example, of a hollow race. Two or more spherical weights may be disposed within the race, which may dynamically balance the contents of the basket.

Figure 19A:
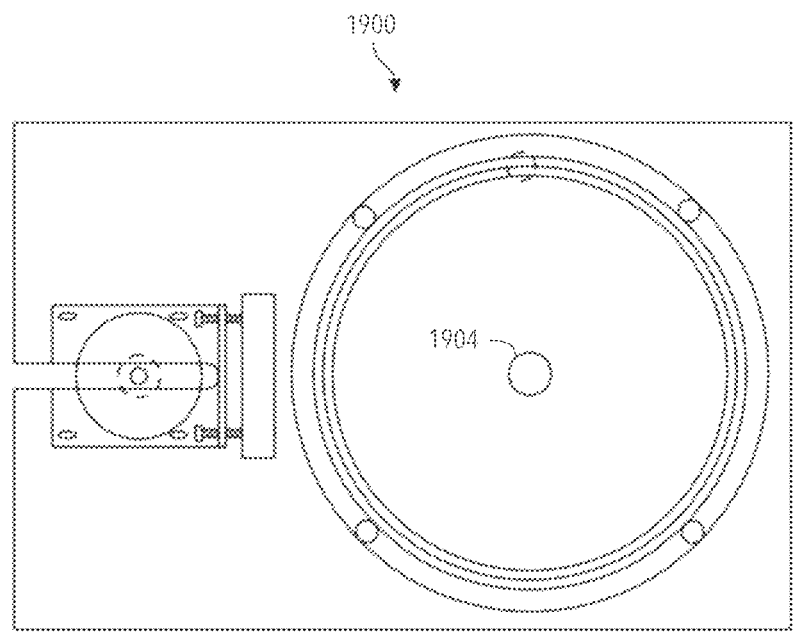
FIG. 19A illustrates a top view of a centrifuge, according to an embodiment.

FIG. 19A illustrates a top view of a centrifuge 1900, according to an embodiment. The centrifuge 1900 may provide for the separation of biomass from extracted product solution.

An extraction processing liquid, such as an ethanol mixture, may be fed from the center tube 1904 of the basket assembly for efficient processing. The liquid may be fed from the top and or the bottom of the center tube 1904, which may spin with the basket assembly. The center tube 1904 may be perforated to allow the liquid to travel radially outward through the tube 1904 and spray the material being processed by the centrifuge 1900, which may generally be located inside the vertical basket wall. A batting or sponge material may be placed inside the center tube 1904 to slow the flow of liquid and create a back pressure in the tube 1904, thereby further enabling an even flow distribution along the height of the tube 1904. In some embodiments, the batting material may be formed into a spiral shape. Alternatively, or in addition to the batting material, the inside wall of the center tube 1904 may be lined with one or more screens to better control the liquid flow. In some embodiments, a 50 gallon per minute flow rate may be achieved with a single screen. This may be slowed to 5-10 gallons per minute using a sponge. The sponge may provide for less tube volume for the liquid to fill, ensuring that the center tube 1904 remains full to the top, thereby enabling an even spray pattern. The features described above in reference to the centrifuge 1900 may be used in conjunction with the centrifuge 100.

Figure 19B:
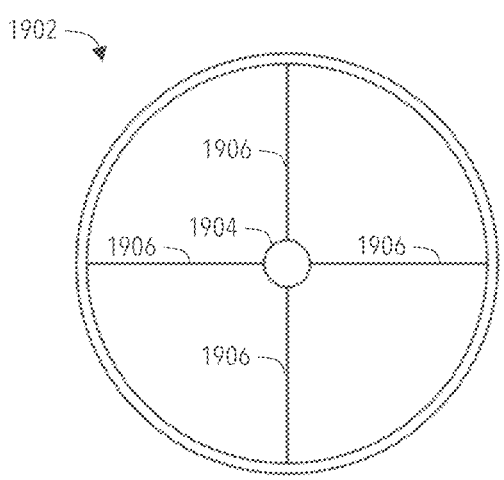
FIG. 19B illustrates a top view of a basket, according to an embodiment.

FIG. 19B illustrates a top view of a basket 1902, according to an embodiment. The basket 1902 may hold contents within the centrifuge 1900. The basket 1902 may include a center tube 1904 and two or more baffles 1906. The center tube 1904 of the basket 1902 may be used to distribute a solvent into the basket. The baffle 1906 may act to push a bag containing biomass around a basin independently of the motion of the solvent therein.

Figure 19C:
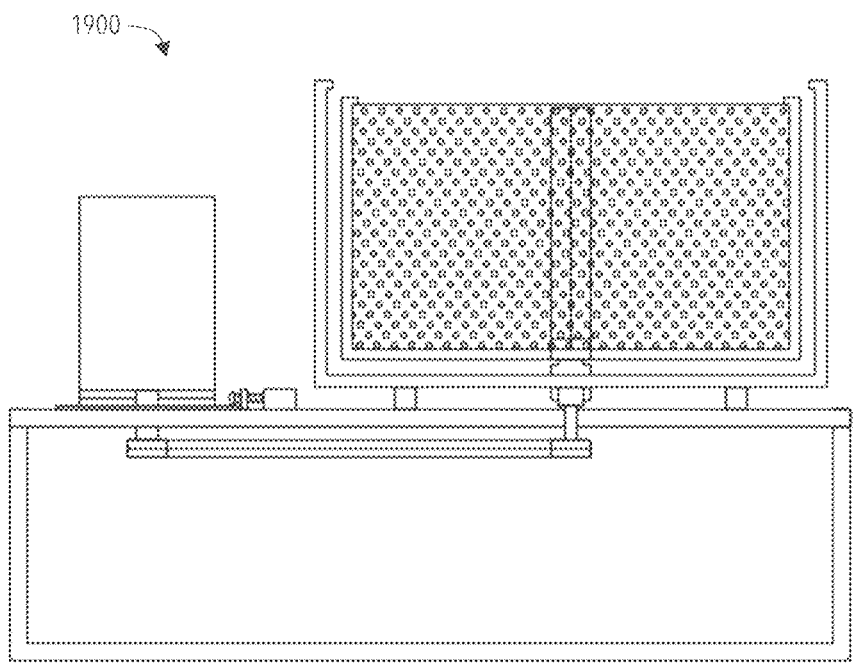
FIG. 19C illustrates a cross sectional side view of a centrifuge, according to an embodiment.

FIG. 19C illustrates a side view of a centrifuge 1900, according to an embodiment. The side view of the centrifuge 1900 may provide for additional details as to the components of the centrifuge 1900. The side view of the centrifuge 1900 may illustrate the coupling of a motor to the basket within the basin. The coupling may be via, for example, a belted sheave system.

Figure 19D:
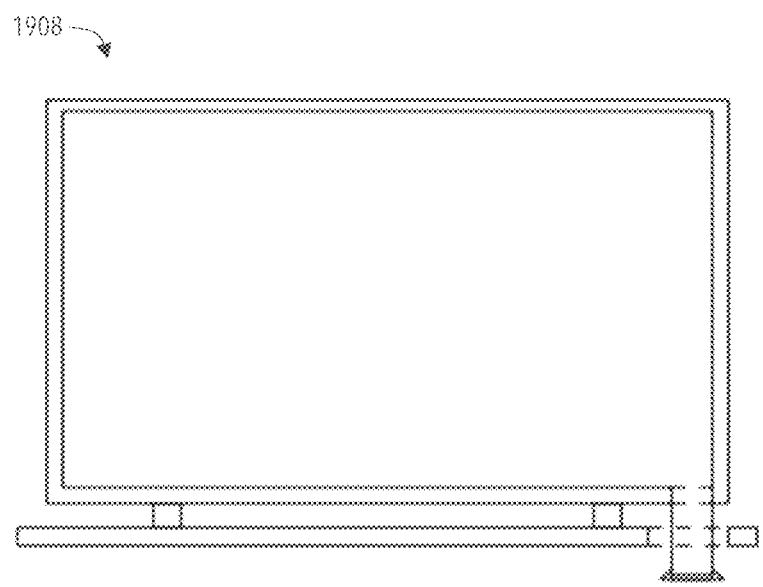
FIG. 19D illustrates side view of a basin, according to an embodiment.

FIG. 19D illustrates side view of a basin 1908, according to an embodiment. The basin 1908 may hold a basket, for example, basket 1902, and permit contents of the basin 1908 to drain. The drain of the basin 1908 may provide for an ability to extract or drain contents of the basin (e.g., solvent) selectively to effect a washing process.

Figures 19E, 19F:
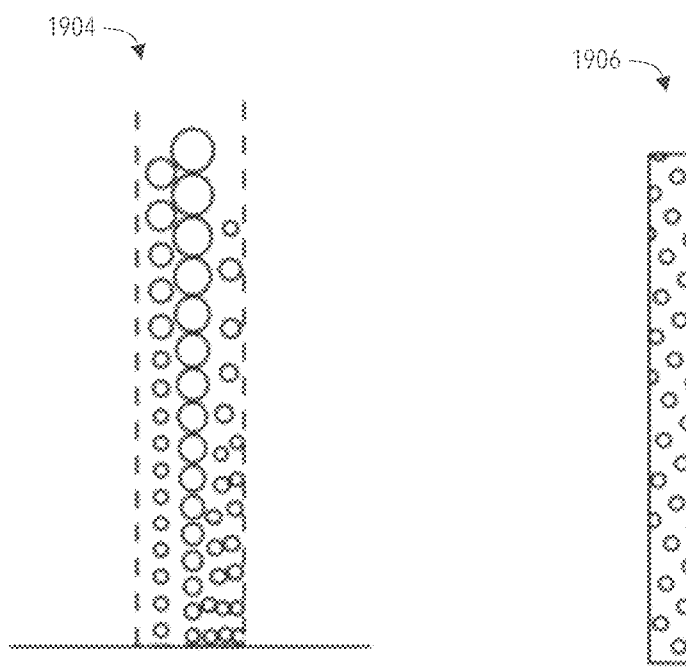
FIG. 19E illustrates a perforated central distributor tube, according to an embodiment.
FIG. 19F illustrates a perforated baffle, according to an embodiment.

FIG. 19E illustrates a perforated tube 1904, according to an embodiment. The perforated tube 1904 may provide for the distribution of solvent within the contents of a basket 1902. The perforations of the perforated tube 1904 may be such that solvent can pass through to bags containing a biomass, which are positioned around the tube. To allow for an even spray pattern (e.g., the same amount of liquid emerging from the top, middle and bottom of the center tube 1904), the holes may vary in size and or in density. For example, to counteract a pressure gradient inside the tube 1904 that may be due to the liquid being fed from the bottom and or the effects of gravity, the holes in the center tube 1904 may be smaller and or spaced farther apart at the bottom of the tube 1904 and increase in size and or number towards the top of the tube 1904. In this way, the perforated tube 1904 may provide for even distribution of solvent into the biomass.

FIG. 19F illustrates a perforated baffle 1906, according to an embodiment. The perforated baffle 1906 may provide for separation of certain contents, as well as generate effective quadrants within a basket 1902. The perforations of the perforated baffle 1906 may be such that a bag containing a biomass cannot pass through, yet a solvent can. In this way, the perforated baffle 1906 may act to push a bag containing biomass around a basin independently of the motion of the solvent therein.

FIG. 20 illustrates a table of specifications 2000 of an example centrifuge, according to an embodiment. The table of specifications 2000 may provide for an example embodiment of a centrifuge and example operating parameters thereof.

The table of specifications 2000 may contain process parameters that may be varied depending on an embodiment process. For example, a first process may require a set of parameters different from those listed in the table of specifications 2000, and a second process may require use of some of the same parameters listed in the table of specifications 2000, but vary in others.

Figure 21:
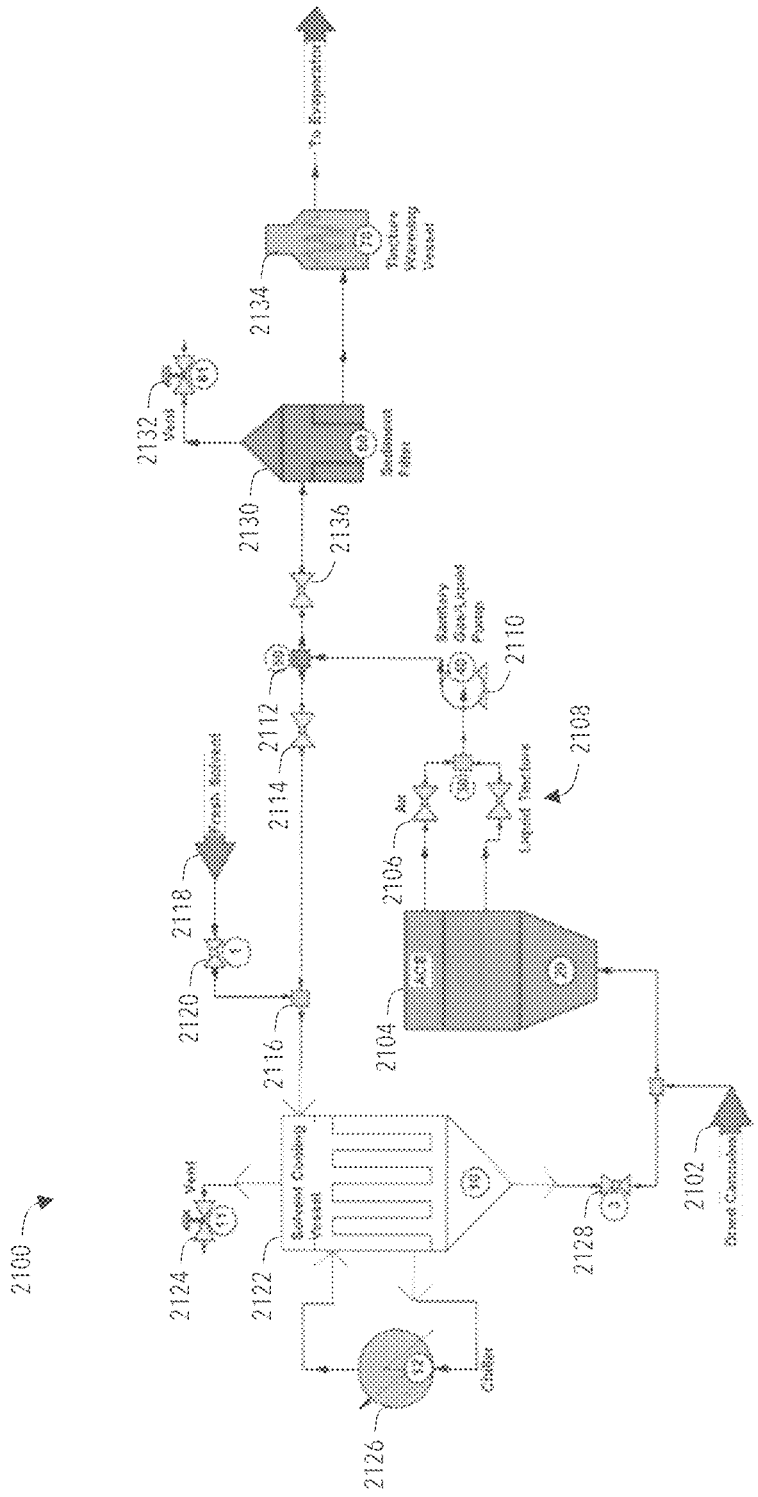
FIG. 21 illustrates an extraction process system, according to an embodiment.

FIG. 21 illustrates an extraction process system 2100, according to an embodiment. The system 2100 may be used to perform an extraction using a centrifuge (e.g., the centrifuge 100). The system 2100 may provide for an ability to extract cannabinoid rich resin from *cannabis* using ethanol solvent and provide rapid initial filtration and recovery of the extraction solution (i.e., process tincture). The system 2100 may provide an effective closed-loop extraction minimizing exposure to hazardous solvent liquid and vapor, simultaneously improving extraction efficiency, effectiveness, and economy. The system 2100 may provide users control of essential extraction process variables, including solvent selectivity through a wide range of low temperature, extraction efficiency through biomass/solvent resident time, or force of interaction through agitation/rotation speed.

The system 2100 may be used to extract cannabinoids from raw *cannabis* using Ethanol (EtOH). Extraction temperature and extraction time may be user adjustable to allow for the greatest flexibility in end products. In particular, this example process may be used to create a cannabinoid resin concentrate.

At an inlet 2102, dried *cannabis* may be provided as an input material. At a centrifuge 2104, the centrifuge may be used to separate cannabinoids from the raw *cannabis*, after receiving a solvent (e.g., ethanol) via a valve 2128. From the centrifuge 2104, air may be drawn off proximate to a valve 2106 and a liquid tincture may be drawn off proximate to a valve 2108. The sanitary gas/liquid pump 2110 may pump the product to a tee 2112. From the tee 2112, solvent may be drawn through a valve 2114 to a tee 2116, where it may be combined with fresh solvent input into the system 2100 via an inlet 2118 through a valve 2120, and flow into a solvent cooling vessel 2112. The solvent cooling vessel 2122 may vent via a valve 2124 and may be chilled via a chiller 2126. Products may flow from the tee 2112 through a valve 2136 into a sediment filter 2130, which may vent via a valve 2132. The product may then pass through a tincture warning vessel 2134 and pass toward an evaporator.

Figure 22:
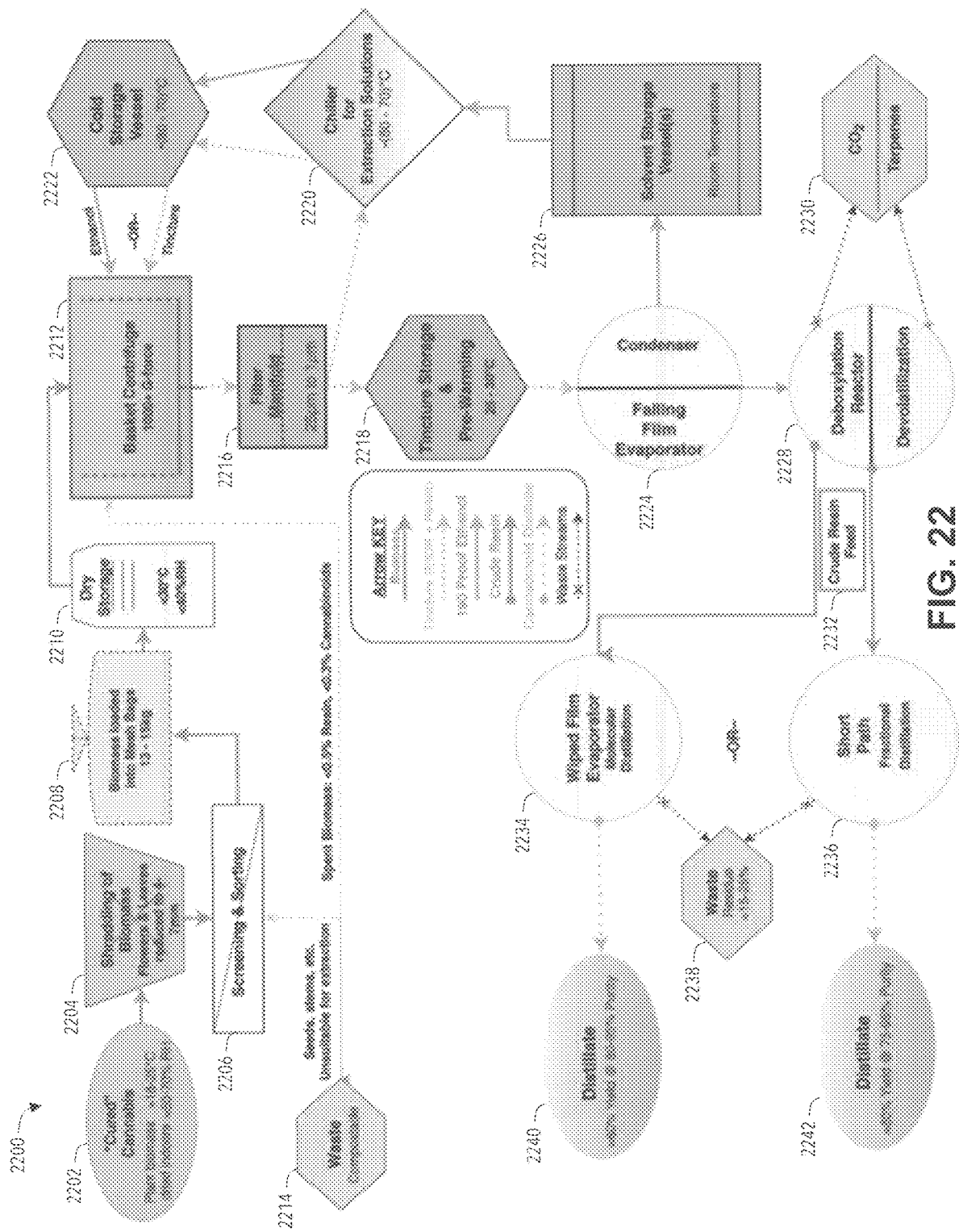
FIG. 22 illustrates an extraction method, according to an embodiment.

FIG. 22 illustrates an extraction method 2200, according to an embodiment. The method 2200 may be used to extract cannabinoids from raw *cannabis* using Ethanol (EtOH). Extraction temperature and extraction time may be user adjustable to allow for the greatest flexibility in end products. In particular, this example process may be used to create a cannabinoid resin concentrate.

At 2202, cured *cannabis* may be input after being dried, cured, and milled to, for example, approximately ¼" to ⅛" square or cube. At 2204, the biomass may be shredded (e.g., flowers and leaves may be reduced to 4-7 mm). At 2206, the biomass may be screened and sorted.

At 2208, the biomass bag may be tared and the biomass may be filled with ground biomass (e.g., to 10-30 pounds). At 2210, the bags may be stored in a dry area. Equipment may be checked (e.g., the centrifuge system, transfer lines, storage vessels, filtration units, and all associated caps and connecting parts). The centrifuge system may be set up per manufacturer specifications. The tare weights for the solvent and tincture vessels may be checked. All surfaces to be used during the extraction process may be sanitized using, for example, ethanol.

At 2212, the drain and fill valves may be opened to fill the centrifuge system. The solvent and centrifuge may be brought to a desired extraction temperature by pumping solvent through centrifuge and back to solvent cooling/storage vessel via a drain. A drain valve may be temporarily closed and/or partially opened to allow centrifuge to fill with liquid for the best liquid coverage (e.g., at a preferred range −40° C./F to −70° C. (−94° F.), or at an allowable range of +30° C. (86° F.) to −80° C. (−112° F.)). The fill pump may be stopped to allow the solvent to drain back into the solvent vessel. The drain valve may be closed, the drain pump stopped, and the switch on the human-machine interface (HMI) to start the process, which may be guided by on-screen instructions. A weighed bag of dried biomass into the basket of the centrifuge system, and the filters may be placed. The lid may be closed and latched, the fill valve and air vent valve may be opened, and pre-chilled ethanol may be pumped into the centrifuge system until the biomass is covered as viewed through a lid sight glass. Stop fill pump before closing fill valve. The fill valve may be closed and, after fill is confirmed, an agitation (e.g., wash) cycle may be run. When the agitation cycle has completed, the drain valve leading back to chilled solvent vessel may be opened.

A liquid drain pump may be used to drain the centrifuge through a sediment filter(s) (e.g., a 10-25 μm polypropylene (PP or PO) felt or pleated element(s)) into receiving tincture vessel or return the solvent into solvent cooling vessel for re-use with fresh biomass. A drain may be open and a gas/liquid capable pump running.

After a bulk of solvent has drained, a spin cycle may be run. For example, with the initial spin speed set at 450 rpm, 5 to 10 gallons of fresh, cold ethanol may be pumped into the centrifuge to rinse resin out of biomass. Depending on the grind level, this rinse may extract residual cannabinoids from 5-9%, down to 0.2-0.4%.

When the spin dry cycle has completed and centrifuge basket has completely stopped, the drain valve may be closed, and a bag of extracted biomass may be removed. The process may be repeated, for example, reusing the same solvent.

At 2214, a compostable waste of spent biomass may be collected.

At 2216, the tincture may be pumped through sanitary polishing filter housings (e.g., 25-1 μm PP depth filter, granular activated charcoal filter, and 10-1 μm PP depth filter, and/or an optional final PVDF membrane sub-micron ultrafilter) into a holding/warming vessel at 2218 for solvent recovery, 23. The pump may be turned off when the filtration is complete.

At 2220, a chiller may be employed to chill the extraction solutions received from the filter manifold for storage in the cold storage vessel at 2222. At 2222, the solvent storage/cooling vessel may be filled with fresh solvent to begin cooling with the chiller.

At 2224, tincture may pass through a falling film evaporator to extract solvent, which may be stored at 2226 at room temperature.

At 2228, a deboxylation reactor may be performed on a portion of reusable waste and distillate received at 2238 and 2240, respectively and distilled molecularly at 2234. The product may be carbon dioxide and terpenes at 2230 and passed back to the distillation system at 2236 mixed with additional distillate received at 2242.

Figure 23:
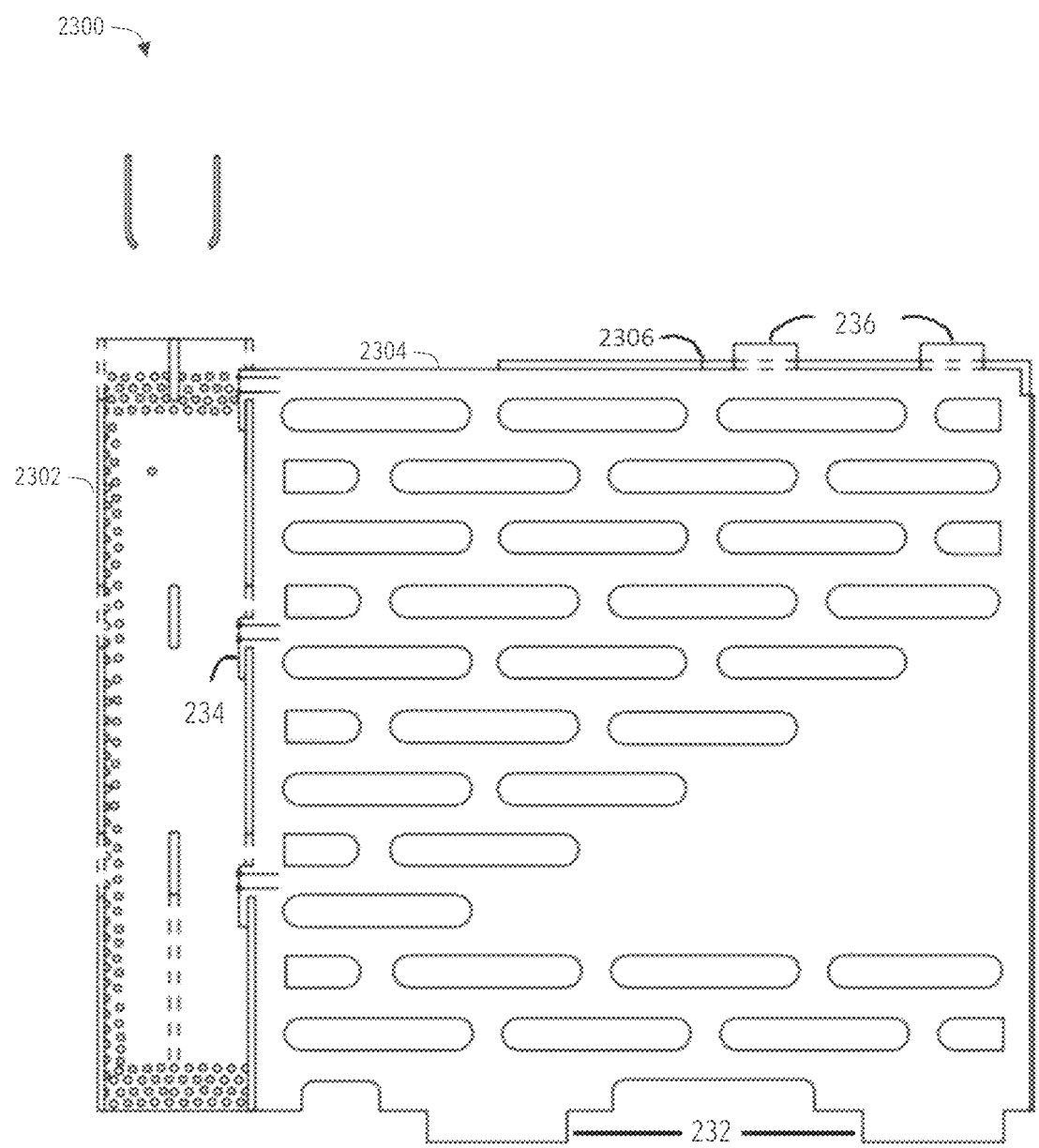
FIG. 23 illustrates a baffle and solvent distributor subassembly of a basket rotor, according to an embodiment.

FIG. 23 illustrates a baffle and solvent distributor subassembly 2300 of a basket rotor, according to an embodiment. The subassembly 2300 may provide for the connection of the slotted lid ring 2306 to a perforated baffle 2304, which is connected to a perforated tube 2302. The perforated tube 2302 may provide for the distribution of a solvent into the basket. The perforated baffle 2304 may provide for guidance of the contents of the basin in circular motion independently of the fluid.

Figure 24A:
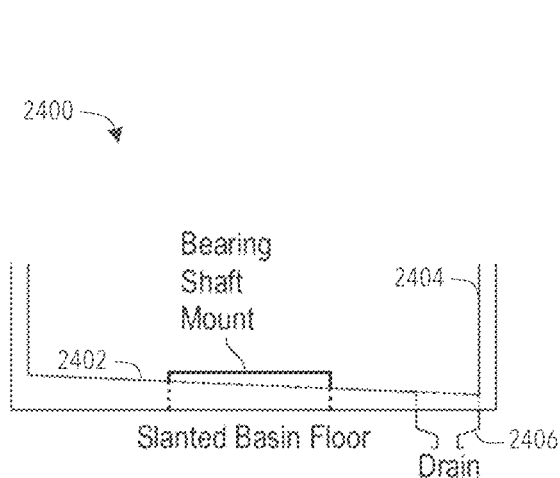
FIG. 24A illustrates a cross-section of a basin floor, according to an embodiment.

FIG. 24A illustrates a cross-section of a basin floor 2402, according to an embodiment. The basin floor 2402 of a basin 2400 may be sloped down to a drain 2406 located adjacent to the vertical interior wall 2404. In this way, a fluid within the basin 2400 may tend to flow toward the drain 2406, promoting efficient draining of the basin 2400.

Figure 24B:
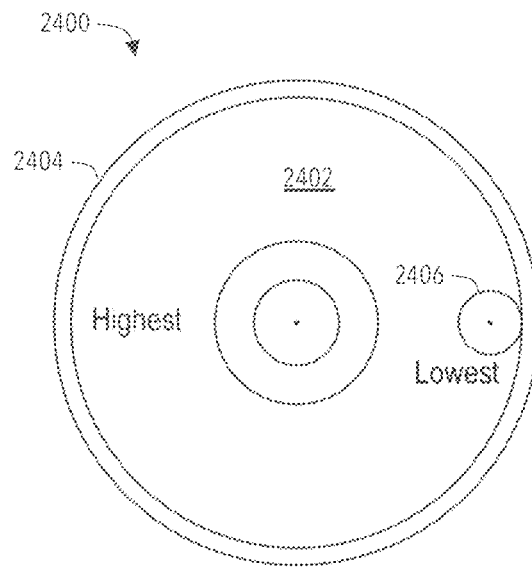
FIG. 24B illustrates a top view of an open basin floor, according to an embodiment.

FIG. 24B illustrates a top view of an open basin floor 2400, according to an embodiment. The basin 2400 may have a basin wall 2404 and a basin floor 2402 sloped down to a drain 2406. In this way, a fluid within the basin 2400 may tend to flow toward the drain 2406, promoting efficient draining of the basin 2400.

Figure 24C:
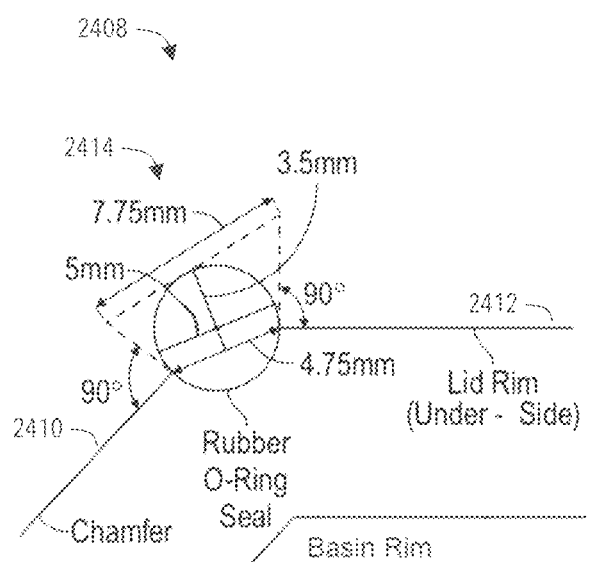
FIG. 24C illustrates a chamfered lid seal, according to an embodiment.

FIG. 24C illustrates a chamfered lid seal 2408, according to an embodiment. The chamfered lid seal may provide a joint between a lid rim 2412 and a chamfered edge 2410 via a seal (e.g., a rubber O-ring seal) 2414. The chamfer and seal of the lid may provide for enhanced sealing of the lid to the basin, providing for better retention of the contents of the centrifuge basin and less residue deposited on the sealing rims.

Figure 25:
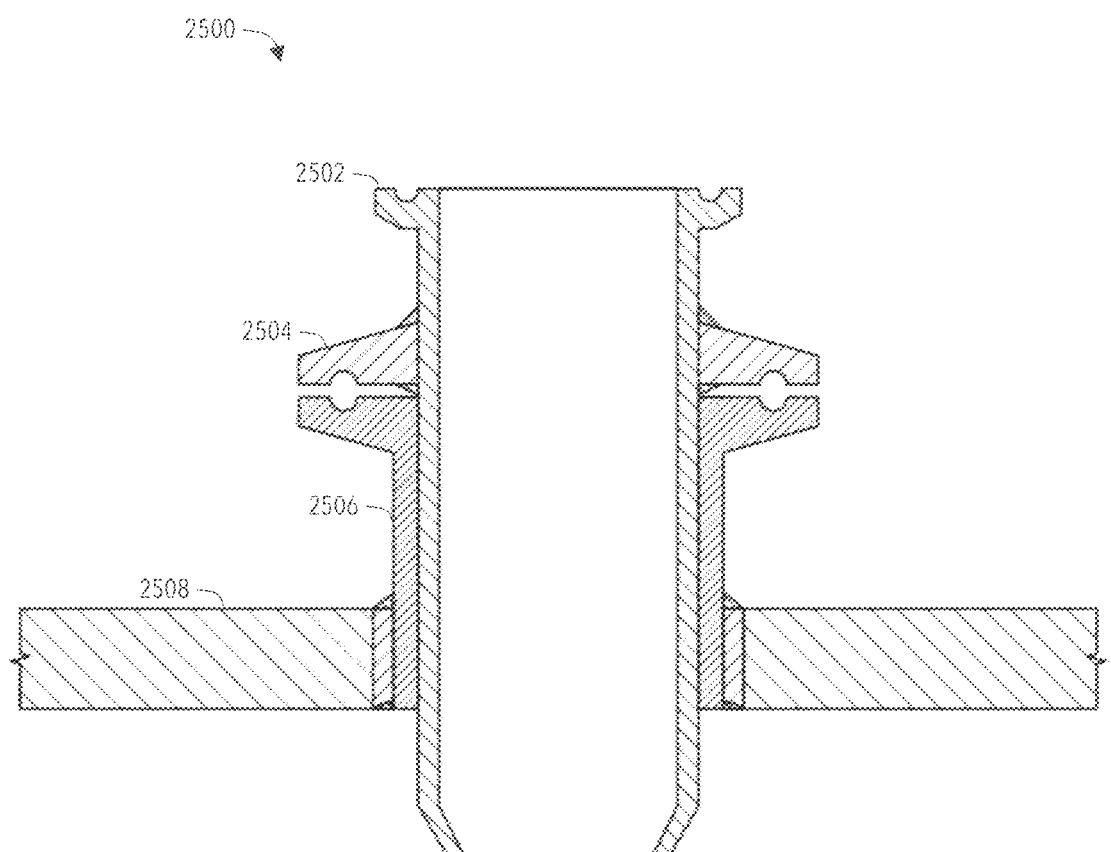
FIG. 25 illustrates conical flow inlet, according to an embodiment.

FIG. 25 illustrates conical flow inlet 2500, according to an embodiment. The conical flow inlet 2500 may provide for flow of products into a basin through the lid 2508. The basin lid 2508 may have a flanged receiving port 2506, which may receive insertion of atop-flanged inlet adapter 2502 having a sealing flange ring 2504 welded around the sanitary tube. The flange ring 2504 may be disposed upon a flange of the receiving port 2506 when the inlet adapter 2502 is inserted into the port 2506.

Figure 26:
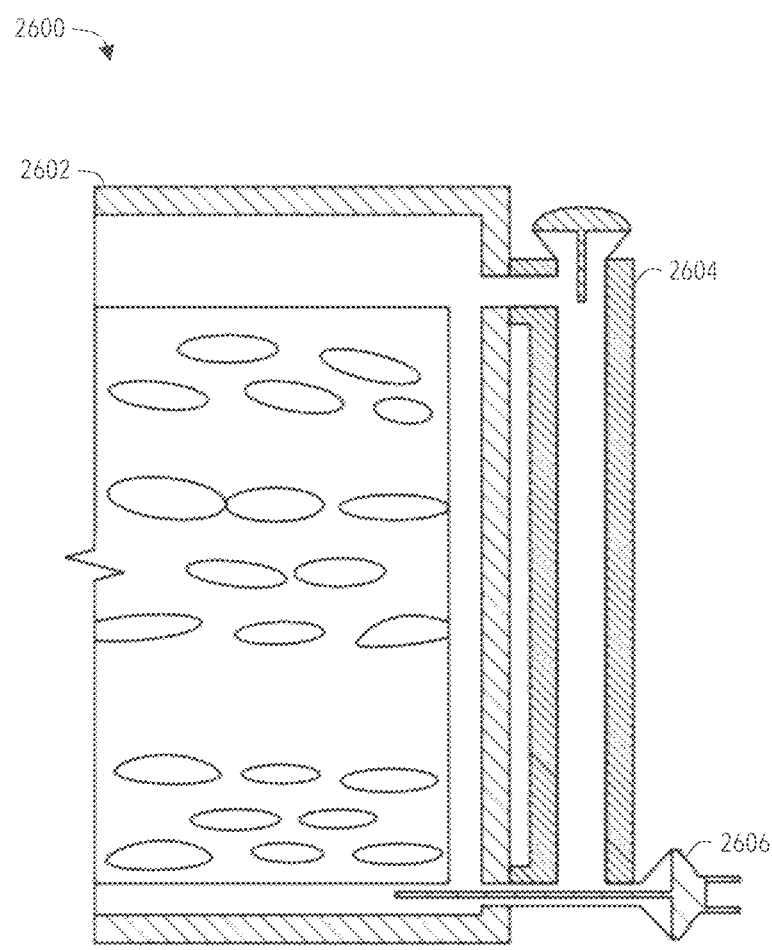
FIG. 26 illustrates a sensor tube subsystem, according to an embodiment.

FIG. 26 illustrates a sensor tube subsystem 2600, according to an embodiment. The sensor tube subsystem 2600 may provide for the measurement of liquid level and temperature within a basin 2602. To effect this, the sensor tube subsystem may include a liquid level tube 2604 (e.g., a sight glass tube, ultrasonic, radar or laser liquid level sensor, float sensor), and a temperature sensor 2606 (e.g., a type-T or type-E thermocouple) attached to the basin 2602.

Figure 27:
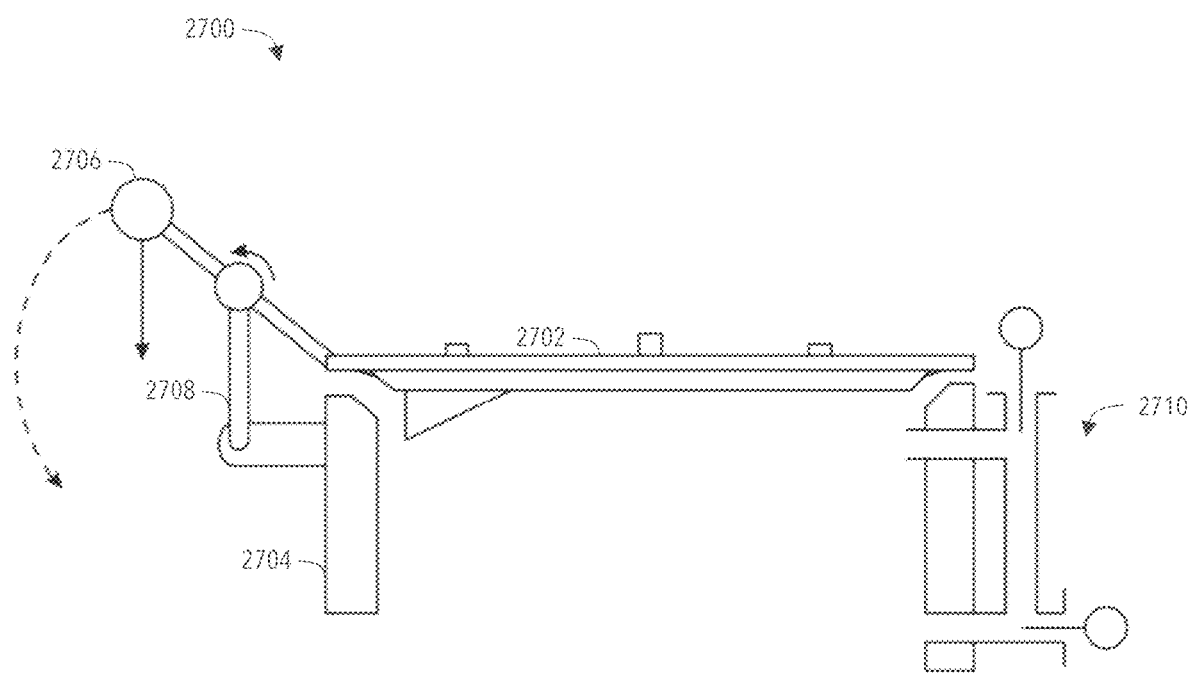
FIG. 27 illustrates a lid opening subsystem, according to an embodiment.

FIG. 27 illustrates a lid opening subsystem 2700, according to an embodiment. The lid opening subsystem may be used to open the lid 2702 and provide for an efficient seal when the lid 2702 is closed. The lid 2702 may be attached to an armature 2706, which may be connected to the basin wall 2704 via an elevated linkage 2708. In this way, by applying force downward on the armature 2706, the lid 2702 may be raised and tilted upwards and away from the basin wall 2702. A sensor tube subsystem 2710 may be disposed through the basin walls 2704, opposite the armature 2706.

Figure 28:
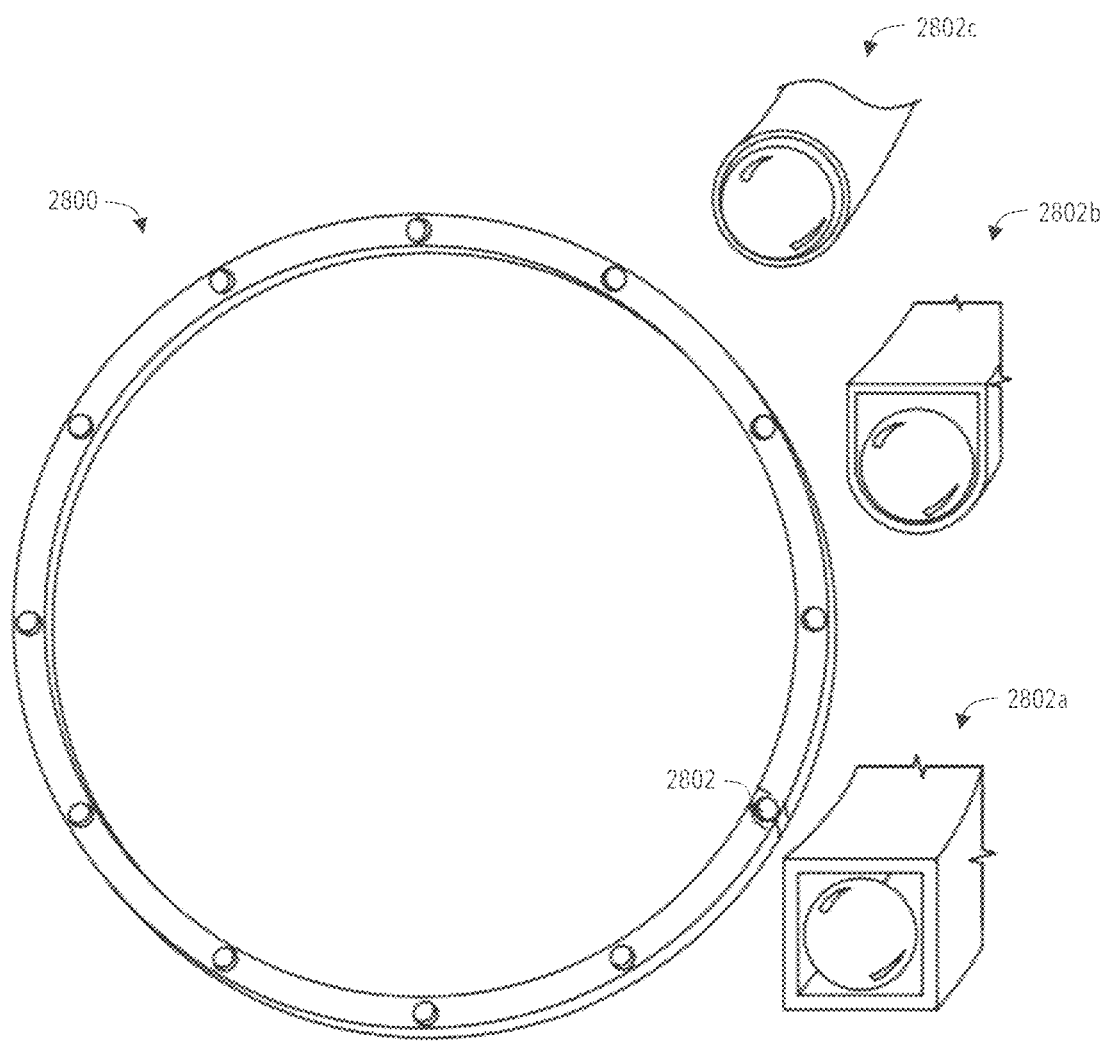
FIG. 28 illustrates an automatic dynamic balancing race ring, according to an embodiment.

FIG. 28 illustrates an automatic dynamic balancing race ring 2800, according to an embodiment. The auto-balancing race ring 2800 may provide for automatic dynamic balancing of the centrifuge basket rotor 200. The auto-balancing race ring 2800 may be a hollow ring of spherical weights that can move around the periphery of the basket rotor inside the centrifuge to balance the spinning load of the basket. The bearing race may be mountable as the top rim 218 or to the bottom plate of the basket rotor of the centrifuge, or it may be integral to the bottom rotor plate of the centrifuge basket.

The auto-balancing race ring 2800 may include spherical weights 2802 (e.g. ball bearings) disposed therein. The spherical weights 2802 may be disposed in varying profiles, including, for example, a square race 2802a, a partially-square and partially-rounded (e.g., bullnose) race 2802b, and a rounded race 2802c.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein may include novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A system, comprising:
a solvent vessel configured to store a solvent at a controlled temperature for use in extracting products from a quantity of biomass;
a centrifuge, comprising:
a basin configured to contain the solvent and a residual amount of the quantity of extracted products and comprising a drain;
a rotor connected to the basin and configured to rotate a circular basket;
a solvent inlet connected to the solvent vessel and configured to selectively permit inflow of the solvent into the basin;
a lid connected to the basin via a hinge and configured to selectively close a top opening of the basin;
the circular basket disposed within the basin, the circular basket comprising:
a basket wall;
a perforated solvent distributor disposed along a longitudinal axis of the circular basket; and
four perforated baffles disposed within the circular basket and connected to the perforated solvent distributor, wherein the four perforated baffles are configured to define four quadrants within the circular basket and force a quantity of cannabinoid resin through the solvent; and
wherein:
the circular basket is configured to receive a bag containing at least a portion of the quantity of the biomass;
the centrifuge is configured to spin the contents of the basket to effect a separation of constituent products from the biomass for processing; and
the system further comprising:
a filter configured to permit passage of the solvent but not of a biomass constituent;
a solvent cooling vessel and/or a warming vessel configured to control the solvent temperature; and
a pump configured to pump the solvent into the solvent vessel for reuse.

2. The system of claim 1, further comprising a balancing race ring configured to counterbalance contents of the basin; the balancing race ring comprising:
two or more spherical weights; and
the balancing race ring configured to receive the two or more spherical weights and configured to permit the two or more spherical weights to move within the balancing race ring while the centrifuge is spinning, thereby counterbalancing the contents of the basin.

3. The system of claim 2, wherein:
the balancing race ring is disposed above the rotor;
the balancing race ring is disposed below the rotor; or
the balancing race ring is integral to the rotor.

4. The system of claim 2, wherein:
the balancing race ring is configured with a square cross-section;
the balancing race ring is configured with a bullnose cross-section; or
the balancing race ring is configured with a circular cross-section.

5. The system of claim 1, further comprising a sensor tube, the sensor tube comprising:
a liquid level measurement instrument; and
a temperature measurement instrument.

6. The system of claim 5, wherein the level measurement instrument comprises:
a laser, radar, or ultrasonic level sensor;
a float; or
a sight glass.

7. The system of claim 5, wherein the temperature measurement instrument is a thermocouple disposed such that its junction is positioned proximate the wall of the basin.

8. The system of claim 1, further comprising a conical flow inlet disposed on the lid of the basin, wherein the conical flow inlet is configured to guide a flow of the solvent to the center of the perforated solvent distributor.

9. The system of claim 1, wherein a bottom of the basin is graded such that the portion of the bottom of the basin proximate the drain forms a low point in the bottom of the basin.

10. The system of claim 1, wherein the centrifuge further comprises mesh packing disposed within the perforated solvent distributor configured to slow the flow of a solvent through the perforated solvent distributor.

11. The system of claim 1, wherein the centrifuge further comprises a basket lid ring disposed on the basket and configured to couple the portion of the quantity of the biomass to the motion of the basket regardless of a momentum of the solvent.

12. A method, comprising:
providing a centrifuge, comprising:
- a basin configured to contain a solvent and a biomass and comprising a drain;
- a lid connected to the basin via a hinge and configured to selectively close a top opening of the basin;
- a circular basket disposed within the basin;
- a motor driving a rotor, wherein the rotor is operatively connected to the circular basket:

placing a bag containing the biomass into the circular basket;
closing the lid;
receiving a flow of the solvent into the basin;
providing power to the motor, thereby turning the rotor, thereby spinning the circular basket; and
wherein the circular basket comprises:
- a basket wall;
- a perforated solvent distributor disposed along a longitudinal axis of the circular basket; and
- a perforated baffle disposed within the circular basket and connected to the perforated solvent distributor; and wherein, as the circular basket is spun, the baffle pushes the bag containing the biomass through the solvent.

13. The method of claim 12, wherein the basket is spun:
bi-directionally from 50 to 200, inclusively, revolutions per minute; or
unidirectionally from 400 to 2000, inclusively, revolutions per minute.

14. The method of claim 12, further comprising passing a resultant product solution through a sanitary polishing filter housing to remove particles larger than a predetermined size.

15. The method of claim 12, further comprising passing a resultant tincture through an evaporator to extract remaining solvent from the resultant tincture for reuse.

* * * * *